(12) United States Patent
Okada et al.

(10) Patent No.: US 9,833,746 B2
(45) Date of Patent: *Dec. 5, 2017

(54) FACILITATED $CO_2$ TRANSPORT MEMBRANE, METHOD FOR PRODUCING SAME, RESIN COMPOSITION FOR USE IN METHOD FOR PRODUCING SAME, $CO_2$ SEPARATION MODULE AND METHOD AND APPARATUS FOR SEPARATING $CO_2$

(71) Applicants: Renaissance Energy Research Corporation, Kyoto (JP); Sumimoto Chemical Company, Limited, Tokyo (JP)

(72) Inventors: Osamu Okada, Kyoto (JP); Nobuaki Hanai, Kyoto (JP); Peng Yan, Kyoto (JP); Junya Miyata, Kyoto (JP); Takehiro Nakasuji, Osaka (JP); Hayato Sugiyama, Osaka (JP)

(73) Assignees: Renaissance Energy Research Corporation, Kyoto (JP); Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/780,965

(22) PCT Filed: Mar. 24, 2014

(86) PCT No.: PCT/JP2014/058047
§ 371 (c)(1),
(2) Date: Sep. 28, 2015

(87) PCT Pub. No.: WO2014/157069
PCT Pub. Date: Oct. 2, 2014

(65) Prior Publication Data
US 2016/0051938 A1 Feb. 25, 2016

(30) Foreign Application Priority Data
Mar. 29, 2013 (JP) .................. 2013-073644

(51) Int. Cl.
*B01D 53/22* (2006.01)
*B01D 69/14* (2006.01)
(Continued)

(52) U.S. Cl.
CPC ......... *B01D 69/145* (2013.01); *B01D 53/228* (2013.01); *B01D 61/38* (2013.01);
(Continued)

(58) Field of Classification Search
CPC .... B01D 69/145; B01D 53/228; B01D 61/38; B01D 63/06; B01D 67/0079;
(Continued)

(56) References Cited

U.S. PATENT DOCUMENTS 2,840,450 A * 6/1958 Giammarco ........... B01D 53/14
423/232
4,117,079 A * 9/1978 Bellows ............... B01D 53/864
423/219

(Continued)

FOREIGN PATENT DOCUMENTS

EP 2239048 A1 10/2010
JP 07112122 5/1995

(Continued)

OTHER PUBLICATIONS

"Derive" American Heritage Dictionary of the English Language, Fifth Edition. 2011 by Houghton Mifflin; 1 page http://www.thefreedictionary.com/derived.*

(Continued)

*Primary Examiner* — Anthony Shumate
(74) *Attorney, Agent, or Firm* — Haynes Beffel & Wolfeld LLP

(57) ABSTRACT

Provided is a facilitated $CO_2$ transport membrane having improved $CO_2$ permeance and improved $CO_2$ selective permeability. The facilitated $CO_2$ transport membrane includes (Continued)

a separation-functional membrane comprising a hydrophilic polymer gel membrane which contains a $CO_2$ carrier and a $CO_2$ hydration catalyst, wherein the hydrophilic polymer is a copolymer including a first structural unit derived from an acrylic acid cesium salt or an acrylic acid rubidium salt and a second structural unit derived from vinyl alcohol. More preferably, the $CO_2$ hydration catalyst has catalytic activity at a temperature of 100° C. or higher.

20 Claims, 8 Drawing Sheets

(51) Int. Cl.
    *B01D 71/38* (2006.01)
    *B01D 71/40* (2006.01)
    *B01D 61/38* (2006.01)
    *B01D 63/06* (2006.01)
    *C08F 230/00* (2006.01)
    *B01D 67/00* (2006.01)
    *B01D 71/80* (2006.01)

(52) U.S. Cl.
    CPC ......... *B01D 63/06* (2013.01); *B01D 67/0079* (2013.01); *B01D 69/142* (2013.01); *B01D 71/38* (2013.01); *B01D 71/40* (2013.01); *B01D 71/80* (2013.01); *C08F 230/00* (2013.01); *Y02C 10/04* (2013.01)

(58) Field of Classification Search
    CPC ...... B01D 69/142; B01D 71/38; B01D 71/40; B01D 71/80; C08F 230/00; Y02C 10/04
    See application file for complete search history.

(56) References Cited

U.S. PATENT DOCUMENTS

| | | | | |
|---|---|---|---|---|
| 5,445,669 | A * | 8/1995 | Nakabayashi ....... | B01D 53/228 423/226 |
| 5,620,500 | A * | 4/1997 | Fukui ................. | B01D 53/22 95/52 |
| 5,928,792 | A * | 7/1999 | Moya ................. | B01D 67/0088 427/235 |
| 5,976,380 | A * | 11/1999 | Moya ................. | B01D 63/061 210/321.75 |
| 6,315,968 | B1 * | 11/2001 | Quinn ................. | B01D 53/228 423/220 |
| 2003/0131731 | A1 * | 7/2003 | Koros ................. | B01D 53/22 96/10 |
| 2003/0183575 | A1 * | 10/2003 | Zeiher ................. | B01D 61/12 210/639 |
| 2004/0200618 | A1 * | 10/2004 | Piekenbrock ....... | E21B 41/0057 166/305.1 |
| 2005/0271609 | A1 * | 12/2005 | Fei ..................... | A61K 8/042 424/65 |
| 2007/0272614 | A1 | 11/2007 | Minhas et al. | |
| 2008/0173179 | A1 * | 7/2008 | Tandon .............. | B01D 67/0006 96/12 |
| 2009/0018221 | A1 * | 1/2009 | Klepper ............. | C07C 29/1518 518/703 |
| 2009/0148777 | A1 * | 6/2009 | Song ................... | C08G 65/333 429/310 |
| 2010/0022978 | A1 * | 1/2010 | Kasai ................ | A61F 13/15658 604/367 |
| 2010/0205856 | A1 * | 8/2010 | Kubic ................... | B01D 53/62 44/451 |
| 2011/0036237 | A1 | 2/2011 | Okada et al. | |
| 2012/0048109 | A1 * | 3/2012 | Chinn .................. | B01D 53/228 95/130 |
| 2012/0297976 | A1 | 11/2012 | Sano | |
| 2013/0052561 | A1 * | 2/2013 | Hommura ........... | H01M 8/1023 429/483 |
| 2013/0160650 | A1 | 6/2013 | Okada et al. | |
| 2013/0177709 | A1 * | 7/2013 | Ishikawa ................. | C23C 22/20 427/385.5 |
| 2013/0199370 | A1 * | 8/2013 | Okada .................. | B01D 53/228 95/52 |
| 2013/0284022 | A1 | 10/2013 | Hiraki et al. | |
| 2013/0287678 | A1 | 10/2013 | Okada et al. | |
| 2013/0287958 | A1 | 10/2013 | Oouchi | |
| 2014/0020557 | A1 * | 1/2014 | Zhou .................... | B01D 53/229 95/51 |
| 2014/0352540 | A1 | 12/2014 | Okada et al. | |
| 2015/0151243 | A1 | 6/2015 | Okada et al. | |
| 2015/0283518 | A1 * | 10/2015 | Hirose ................... | B01D 71/38 422/211 |
| 2016/0051938 | A1 | 2/2016 | Okada et al. | |

FOREIGN PATENT DOCUMENTS

| | | |
|---|---|---|
| JP | 08229367 A | 9/1996 |
| JP | H08243364 A | 9/1996 |
| JP | 2008-36463 A | 2/2008 |
| JP | 2008-36464 A | 2/2008 |
| JP | 2009195900 A | 9/2009 |
| JP | 2011161387 A | 8/2011 |
| JP | 2012143711 A | 8/2012 |
| JP | 2013027850 A | 2/2013 |
| JP | 2013049042 A | 3/2013 |
| JP | 2013107076 A | 6/2013 |
| JP | 2014200767 A | 10/2014 |
| JP | 2014213219 A | 11/2014 |
| JP | 2014226650 A | 12/2014 |
| WO | 2009093666 A1 | 7/2009 |
| WO | 2011099587 A1 | 8/2011 |
| WO | 2012086836 A1 | 6/2012 |
| WO | 2012096055 A1 | 7/2012 |
| WO | 2014054619 A1 | 4/2014 |
| WO | 2014065387 A1 | 5/2014 |

OTHER PUBLICATIONS

Los Alamos National Laboratory, "Periodic Table of Elements," 1 page, retrieved Aug. 7, 2015, http://periodic.lanl.gov/index.shtml.*
Aston Chemical "Acrylate Cesium" May 16, 2016, 1 page, http://www.astonchem.com/pro_result/514118/.*
Butterman et al. "Cesium metal absorbs gases and other impurities in ferrous and nonferrous metallurgy and in the purification of carbon dioxide" USGS 2004 13 pgs http://pubs.usgs.gov/of/2004/1432/2004-1432.pdf.*
Kiese "The Catalytic Hydration of Carbon Dioxide" J. Biol. Chem.—1940-267-80.*
Berg "Biochemistry. 5th edition." New York: W H Freeman; 2002 http://www.ncbi.nlm.nih.gov/books/NBK22599/.*
You-In Park et al., "Preparation of Water-Swollen Hydrogel Membranes for Gas Separation," Journal of Applied Polymer Science, vol. 80, 1785-1791 (2001), pp. 1785-1791.
JP 2014-506653—Office Action dated Apr. 8, 2014, 4 pages.
EP 13848273.2—Extended Search Report dated Jun. 10, 2016, 6 pages.
TW 102137653—Office Action dated Feb. 3, 2017, 5 pages.

* cited by examiner

| Sample | Constitutional conditions of separation-functional membranes | | | | | Membrane performance | | |
|---|---|---|---|---|---|---|---|---|
| | $CO_2$ hydration catalyst | $CO_2$ carrier | Molar Ratio of $CO_2$ carrier to medium | Polymer PVA/PAA salt copolymer | Concentration of polymer and $CO_2$ carrier (wt%) | $CO_2$ permeance $(mol/(m^2 \cdot s \cdot kPa))$ | $H_2$ permeance $(mol/(m^2 \cdot s \cdot kPa))$ | $CO_2/H_2$ selectivity |
| Example 1 | Potassium tellurite | Cesium carbonate | 1 : 0.025 | Cesium salt | 7.7 | $6.61 \times 10^{-5}$ | $5.18 \times 10^{-7}$ | 128 |
| Example 2 | Potassium tellurite | Cesium carbonate | 1 : 0.1 | Cesium salt | 7.7 | $7.24 \times 10^{-5}$ | $5.44 \times 10^{-7}$ | 133 |
| Example 3 | Potassium tellurite | Cesium carbonate | 1 : 0.2 | Cesium salt | 7.7 | $7.93 \times 10^{-5}$ | $4.08 \times 10^{-7}$ | 195 |
| Example 4 | Potassium tellurite | Cesium carbonate | 1 : 0.025 | Cesium salt | 11.1 | $6.93 \times 10^{-5}$ | $3.28 \times 10^{-7}$ | 211 |
| Example 5 | Sodium arsenite | Cesium carbonate | 1 : 0.025 | Cesium salt | 11.1 | $5.56 \times 10^{-5}$ | $4.92 \times 10^{-7}$ | 113 |
| Example 6 | Potassium selenite | Cesium carbonate | 1 : 0.025 | Cesium salt | 7.7 | $5.15 \times 10^{-5}$ | $4.64 \times 10^{-7}$ | 111 |
| Example 7 | Potassium tellurite | Rubidium carbonate | 1 : 0.05 | Cesium salt | 7.7 | $7.19 \times 10^{-5}$ | $5.09 \times 10^{-7}$ | 141 |
| Comparative Example 1 | none | Cesium carbonate | — | Sodium salt | 7.7 | $2.83 \times 10^{-5}$ | $3.58 \times 10^{-7}$ | 79.2 |
| Comparative Example 2 | none | Rubidium carbonate | — | Sodium salt | 7.7 | $2.84 \times 10^{-5}$ | $3.05 \times 10^{-7}$ | 93.1 |

Fig. 3

| Sample | Constitutional conditions of separation-functional membranes | | | | | | Evaluation condition | Membrane performance | | |
|---|---|---|---|---|---|---|---|---|---|---|
| | $CO_2$ hydration catalyst | $CO_2$ carrier | Molar Ratio of $CO_2$ carrier to medium | Polymer PVA/PAA salt copolymer | Concentration of polymer and $CO_2$ carrier (wt%) | Number of times of application | Treatment temperature (°C) | $CO_2$ permeance (mol/($m^2 \cdot s \cdot kPa$)) | $N_2$ permeance (mol/($m^2 \cdot s \cdot kPa$)) | $CO_2/N_2$ selectivity |
| Example 8 | Potassium tellurite | Cesium carbonate | 1 : 0.025 | Cesium salt | 7.7 | 2 | 130 | $5.03 \times 10^{-5}$ | $6.53 \times 10^{-8}$ | 770 |
| Example 9 | Potassium tellurite | Cesium carbonate | 1 : 0.025 | Cesium salt | 7.7 | 2 | 110 | $3.98 \times 10^{-5}$ | $4.14 \times 10^{-8}$ | 961 |
| Comparative Example 3 | none | Cesium carbonate | — | Sodium salt | 7.7 | 2 | 110 | $1.66 \times 10^{-5}$ | $3.56 \times 10^{-8}$ | 466 |

Fig. 7

FACILITATED $CO_2$ TRANSPORT MEMBRANE, METHOD FOR PRODUCING SAME, RESIN COMPOSITION FOR USE IN METHOD FOR PRODUCING SAME, $CO_2$ SEPARATION MODULE AND METHOD AND APPARATUS FOR SEPARATING $CO_2$

CROSS-REFERENCE TO RELATED APPLICATIONS

This application is a National Phase filing under 35 U.S.C. §371 of International Application No. PCT/JP2014/058047 filed on Mar. 24, 2014, which claims priority to Japanese Patent Application No. 2013-073644 filed on Mar. 29, 2013.

PARTIES TO A JOINT RESEARCH AGREEMENT

Renaissance Energy Research Corporation, a corporation of Japan, and Sumitomo Chemical Company, Limited, a corporation of Japan, are parties to a Joint Research Agreement.

TECHNICAL FIELD

The present invention relates to a facilitated $CO_2$ transport membrane for use in separating carbon dioxide ($CO_2$), particularly to a facilitated $CO_2$ transport membrane designed to separate carbon dioxide with high $CO_2$ selective permeability from a mixed gas containing carbon dioxide and at least one gas selected from hydrogen, helium, nitrogen, oxygen, carbon monoxide, hydrocarbon (such as methane, ethane, or propane), and unsaturated hydrocarbon (such as ethylene or propylene) and the like. The present invention further relates to a method for producing the facilitated $CO_2$ transport membrane and to a method and an apparatus for separating $CO_2$ using the facilitated $CO_2$ transport membrane.

BACKGROUND ART

A chemical absorption method is used in a decarbonation process performed in existing large-scale plants for hydrogen production, urea production, or the like. To separate $CO_2$, such a chemical absorption method requires a huge $CO_2$ absorption tower and a huge tower for regenerating a $CO_2$ absorbing liquid. The step of regenerating the $CO_2$ absorbing liquid also wastefully consumes energy because it requires a large amount of steam to remove $CO_2$ from the $CO_2$ absorbing liquid by heating for the reuse of the liquid.

In recent years, as a countermeasure for global warming, natural energy that does not emit $CO_2$ has been expected to come into wide use, but natural energy has a significant problem in terms of cost. Thus, attention has been paid to a method called CCS (Carbon dioxide Capture and Storage) in which $CO_2$ is separated and collected from waste gases from thermal power plants, ironworks and the like, and buried in the ground or sea. Currently, even CCS is based on application of the chemical absorption method. In this case, for separating and collecting $CO_2$ from thermal power plants, not only large-scale $CO_2$ separation equipment is required, but also a large amount of steam should be fed.

Besides separation and collection of $CO_2$ from waste gases from thermal power plants and the like, for example, purification of natural gas as a major energy source requires separation of $CO_2$ because it contains several % of $CO_2$ in addition to methane as a main component. A chemical absorption method is used in existing processes for such purification.

On the other hand, a $CO_2$ separation and collection process using a membrane separation method is intended to separate a gas by means of a difference in velocity of gases passing through a membrane using a partial pressure difference as driving energy, and is expected as an energy-saving process because the pressure of a gas to be separated can be utilized as energy and no phase change is involved.

Gas separation membranes are broadly classified into organic membranes and inorganic membranes in terms of a difference in membrane material. The organic membrane has the advantage of being inexpensive and excellent in moldability as compared to the inorganic membrane. The organic membrane that is used for gas separation is generally a polymer membrane prepared by a phase inversion method, and the mechanism of separation is based on a solution-diffusion mechanism in which a gas is separated by means of a difference in solubility of the gas in the membrane material and diffusion rate of the gas in the membrane.

The solution-diffusion mechanism is based on the concept that a gas is first dissolved in the membrane surface of a polymer membrane, and the dissolved molecules diffuse between polymer chains in the polymer membrane. Where for a gas component A, the permeability coefficient is $P_A$, the solubility coefficient is $S_A$, and the diffusion coefficient is $D_A$, the relational expression: $P_A=S_A \times D_A$ holds. The ideal separation factor $\alpha_{A/B}$ is expressed as $\alpha_{A/B}=P_A/P_B$ by taking the ratio of permeability coefficients between components A and B, and therefore $\alpha_{A/B}=(S_A/S_B) \times (D_A/D_B)$ holds. Here, $S_A/S_B$ is referred to as solubility selectivity, and $D_A/D_B$ is referred to as diffusivity selectivity.

Since the diffusion coefficient increases as the molecular diameter decreases, and the contribution of diffusivity selectivity is generally greater than that of solubility selectivity in gas separation, it is difficult to allow selective passage of gases having a larger molecular diameter by suppressing passage of gases having a smaller molecular diameter among multi-component gases having different molecular diameters.

Thus, studies are conducted on a permeable membrane called a facilitated transport membrane that allows selective permeation of a gas by a facilitated transport mechanism, in addition to a solution-diffusion mechanism, using a substance called a "carrier" which selectively and reversibly reacts with $CO_2$ (see, for example, Patent Document 1 below). The facilitated transport mechanism has a structure in which a membrane contains a carrier which selectively reacts with $CO_2$. In the facilitated transport membrane, $CO_2$ passes not only physically by the solution-diffusion mechanism but also as a reaction product with the carrier, so that the permeation rate is accelerated. On the other hand, gases such as $N_2$, $CH_4$ and $H_2$, which do not react with the carrier, pass only by the solution-diffusion mechanism, and therefore the separation factor of $CO_2$ with respect to these gases is extremely high. Energy generated during the reaction of $CO_2$ with the carrier is utilized as energy for releasing $CO_2$ by the carrier, and therefore there is no need to supply energy from outside, so that an essentially energy-saving process is provided.

PRIOR ART DOCUMENT

Patent Document

Patent Document 1: International Publication No. WO 2009/093666

SUMMARY OF THE INVENTION

Problems to be Solved by the Invention

Patent Document 1 proposes a facilitated $CO_2$ transport membrane having a $CO_2$ permeance and a $CO_2/H_2$ selectivity feasible at a high temperature condition of 100° C. or higher by using as a carrier a specific alkali metal salt such as cesium carbonate or rubidium carbonate.

The facilitated $CO_2$ transport membrane has a higher $CO_2$ permeation rate as compared to a membrane based on a solution-diffusion mechanism, but the number of carrier molecules that react with $CO_2$ molecules becomes less sufficient as the partial pressure of $CO_2$ increases, and therefore improvement is required for accommodating the membrane to carrier saturation even at such a high $CO_2$ partial pressure.

In view of the above-mentioned problems, it is an object of the present invention to stably supply a facilitated $CO_2$ transport membrane having an improved $CO_2$ permeance and an improved $CO_2$ selective permeability.

Means for Solving the Problems

To achieve the object, the present invention provides a facilitated $CO_2$ transport membrane comprising a separation-functional membrane which comprises a hydrophilic polymer gel membrane that contains a $CO_2$ carrier and a $CO_2$ hydration catalyst, wherein the hydrophilic polymer is a copolymer comprising a first structural unit derived from an acrylic acid cesium salt or an acrylic acid rubidium salt and a second structural unit derived from vinyl alcohol. It is to be noted that the $CO_2$ hydration catalyst is a catalyst capable of increasing the rate of the $CO_2$ hydration reaction shown in the following (Chemical Formula 1). The symbol "⇔" in the reaction formulae shown herein indicates that the reaction is reversible.

$$CO_2+H_2O \Leftrightarrow HCO_3^- +H^+ \qquad \text{(Chemical Formula 1)}$$

The reaction of $CO_2$ with the $CO_2$ carrier is expressed by the following (Chemical Formula 2) as an overall reaction formula. It is to be noted that the (Chemical Formula 2) is based on the assumption that the $CO_2$ carrier is a carbonate. The $CO_2$ hydration reaction, one of elementary reactions of the above-mentioned reaction, is an extremely slow reaction under a catalyst-free condition, and addition of a catalyst accelerates the elementary reaction, so that the reaction of $CO_2$ with the $CO_2$ carrier is accelerated, and as a result, improvement of the permeation rate of $CO_2$ is expected.

$$CO_2+H_2O+CO_3^{2-} \Leftrightarrow 2HCO_3^- \qquad \text{(Chemical Formula 2)}$$

Thus, since the facilitated $CO_2$ transport membrane having the above-mentioned features contains a $CO_2$ carrier and a $CO_2$ hydration catalyst in a separation-functional membrane, the reaction of $CO_2$ with the $CO_2$ carrier is accelerated, so that a facilitated $CO_2$ transport membrane having an improved $CO_2$ permeance and an improved $CO_2$ selective permeability can be provided. Further, since the $CO_2$ hydration catalyst effectively functions even at a high $CO_2$ partial pressure, the $CO_2$ permeance and $CO_2$ selective permeability at a high $CO_2$ partial pressure are each improved. Further, since the separation-functional membrane is composed of a gel membrane rather than a liquid membrane or the like, high $CO_2$ selective permeability can be stably exhibited even under pressure.

As a result of extensive studies, the inventors of the present application have further found that when a copolymer including a first structural unit derived from an acrylic acid cesium salt or an acrylic acid rubidium salt and a second structural unit derived from vinyl alcohol is used as a hydrophilic polymer to form a gel membrane, the copolymer can provide further improved $CO_2$ permeance as compared with a general polyvinyl alcohol-polyacrylic acid salt copolymer (PVA/PAA sodium salt copolymer), which has a sodium salt as an acrylic acid salt and the use of which is shown in Patent Document 1, so that $CO_2$ permeance and $CO_2$ selective permeability under high $CO_2$ partial pressure can be further improved, respectively.

In the facilitated $CO_2$ transport membrane with the above features, the gel membrane is a hydrogel in which a three-dimensional network structure is formed when the hydrophilic polymer is crosslinked and which has the property of being swollen when absorbing water. Therefore, the gel membrane, which is composed of a hydrogel having a high water-holding capacity, can hold water as much as possible even at a high temperature capable of causing a reduction in the water content of the separation-functional membrane, so that high $CO_2$ selective permeability can be achieved.

Further, in the facilitated $CO_2$ transport membrane having the above-mentioned features, the $CO_2$ hydration catalyst preferably has catalytic activity at a temperature of 100° C. or higher. The reaction of $CO_2$ with the $CO_2$ carrier is thereby accelerated at a temperature of 100° C. or higher, so that a facilitated $CO_2$ transport membrane having an improved $CO_2$ permeance and an improved $CO_2$ selective permeability can be provided under such a temperature condition.

Further, in the facilitated $CO_2$ transport membrane having the above-mentioned features, the $CO_2$ hydration catalyst preferably has a melting point of 200° C. or higher, and is preferably soluble in water.

In the facilitated $CO_2$ transport membrane with the above features, the $CO_2$ hydration catalyst preferably comprises an oxo acid compound, and in particular, the $CO_2$ hydration catalyst preferably comprises an oxo acid compound of at least one element selected from group 14 elements, group 15 elements, and group 16 elements. More preferably, the $CO_2$ hydration catalyst comprises at least one of a tellurous acid compound, a selenious acid compound, an arsenious acid compound, and an orthosilicic acid compound.

Particularly, when the melting point of the $CO_2$ hydration catalyst is 200° C. or higher, the catalyst can exist in the separation-functional membrane while being thermally stable, so that performance of the facilitated $CO_2$ transport membrane can be maintained over a long period of time. Further, when the $CO_2$ hydration catalyst is soluble in water, a hydrophilic polymer gel membrane containing a $CO_2$ hydration catalyst can be easily and stably prepared. When a tellurous acid compound, an arsenious acid compound or a selenious acid compound is used as the $CO_2$ hydration catalyst, stable improvement of membrane performance can be expected because all of these compounds are water soluble and have a melting point of 200° C. or higher.

In the facilitated $CO_2$ transport membrane with the above features, a content of the second structural unit in the hydrophilic polymer is preferably from 1 mol % to 90 mol % with respect to the total content of the first and second structural units.

In the facilitated $CO_2$ transport membrane with the above features, the $CO_2$ carrier preferably comprises at least one of an alkali metal carbonate, an alkali metal bicarbonate, and an alkali metal hydroxide, and the alkali metal is preferably cesium or rubidium. These features can further ensure high $CO_2$ selective permeability.

Here, a reaction expressed by the above (Chemical Formula 2) occurs when the $CO_2$ carrier is a carbonate of an alkali metal, while a reaction expressed by the following (Chemical Formula 3) occurs when the $CO_2$ carrier is a hydroxide of an alkali metal. The (Chemical Formula 3) shows a case where the alkali metal is cesium as an example.

$$CO_2 + CsOH \rightarrow CsHCO_3$$

$$CsHCO_3 + CsOH \rightarrow Cs_2CO_3 + H_2O \qquad \text{(Chemical Formula 3)}$$

The reactions in the above (Chemical Formula 3) can be united into a reaction expressed by the (Chemical Formula 4). That is, this shows that added cesium hydroxide is converted into cesium carbonate. Further, it is apparent from the above (Chemical Formula 3) that a similar effect can be obtained when as a $CO_2$ carrier, a bicarbonate is added in place of a carbonate of an alkali metal.

$$CO_2 + 2CsOH \rightarrow Cs_2CO_3 + H_2O \qquad \text{(Chemical Formula 4)}$$

Further, in the facilitated $CO_2$ transport membrane having the above-mentioned features, the separation-functional membrane is preferably supported by a hydrophilic porous membrane.

First, when the separation-functional membrane is supported by the porous membrane, the strength of the facilitated $CO_2$ transport membrane at the time of use is improved. As a result, a sufficient membrane strength can be secured even when a pressure difference between both sides of the facilitated $CO_2$ transport membrane (inside and outside of a reactor) is large (e.g. 2 atm or larger).

In addition, when the separation-functional membrane as a gel membrane is supported by a hydrophilic porous membrane, the gel membrane can be stably formed with less defects. The hydrophilic porous membrane is intended to also include a membrane produced by hydrophilization of a hydrophobic porous membrane.

A coating liquid can be provided as a resin composition that comprises a medium containing water, the copolymer as a hydrophilic polymer comprising the first and second structural units, a $CO_2$ carrier, and a $CO_2$ hydration catalyst. When the coating liquid is applied to the hydrophilic porous membrane, the pores of the porous membrane is filled with the coating liquid, and the coating liquid is further deposited on the surface of the porous membrane. When the medium is removed from the resultant coating, a separation-functional membrane can be produced in the form of a gel. In this case, the gel membrane can be deposited not only on the surface of the porous membrane but also in the pores of the porous membrane, so that defects are less likely to occur and the gel membrane can be produced at a high success rate. The medium may also comprise a water-soluble organic solvent in addition to water. The amount of the medium is preferably such that the resultant coating liquid can be kept homogeneous. The medium may be removed from the coating by any method. The medium may be removed by heating, pressure reduction, or natural drying. Preferably, the medium is removed in such a manner that it can partially remain in the coating.

The porous membrane provided to support the separation-functional membrane does not always have to be hydrophilic although it is preferably hydrophilic as mentioned above. A non-defective gel membrane can be formed even on a hydrophobic porous membrane, for example, by increasing the thickness of the coating.

Further, the separation-functional membrane supported by the hydrophilic porous membrane is preferably covered with a hydrophobic porous membrane. The separation-functional membrane is thereby protected by the hydrophobic porous membrane, leading to a further increase in strength of the facilitated $CO_2$ transport membrane at the time of use. The separation-functional membrane is covered with the hydrophobic porous membrane, and therefore even when steam is condensed on the membrane surface of the hydrophobic porous membrane, water is repelled and thereby prevented from penetrating the separation-functional membrane because the porous membrane is hydrophobic. Accordingly, the hydrophobic porous membrane can prevent a situation in which the $CO_2$ carrier in the separation-functional membrane is diluted with water, and the diluted $CO_2$ carrier flows out of the separation-functional membrane.

The present invention further provides a method for producing the facilitated $CO_2$ transport membrane with the above features. The method comprises the steps of applying to a porous membrane a coating liquid comprising a medium containing water, the hydrophilic polymer, the $CO_2$ carrier, and the $CO_2$ hydration catalyst; and removing the medium from the resultant coating to produce the separation-functional membrane in the form of a gel.

According to the facilitated $CO_2$ transport membrane-producing method with the above features, the coating liquid can be previously prepared so as to have a suitably adjusted ratio of the $CO_2$ carrier and the water-soluble $CO_2$ hydration catalyst to the hydrophilic polymer, so that the mixing ratio of the $CO_2$ carrier and the $CO_2$ hydration catalyst in the final gel membrane can be easily made suitable, which makes it possible to provide a high-performance membrane.

The present invention further provides a $CO_2$ separating method comprising the steps of: supplying a $CO_2$-containing mixed gas to the facilitated $CO_2$ transport membrane with the above features; and separating from the mixed gas the $CO_2$ having permeated the facilitated $CO_2$ transport membrane.

The present invention further provides a $CO_2$ separation membrane module comprising the facilitated $CO_2$ transport membrane with the above features.

The present invention further provides a $CO_2$ separation apparatus comprising: the facilitated $CO_2$ transport membrane with the above features; a gas supply unit configured to supply a $CO_2$-containing mixed gas to the facilitated $CO_2$ transport membrane; and a gas separation unit configured to separate from the mixed gas the $CO_2$ having permeated the facilitated $CO_2$ transport membrane.

The present invention further provides a resin composition for use in the production of the facilitated $CO_2$ transport membrane with the above features. The resin composition comprises a $CO_2$ carrier, a $CO_2$ hydration catalyst, and a copolymer comprising a first structural unit derived from an acrylic acid cesium salt or an acrylic acid rubidium salt and a second structural unit derived from vinyl alcohol.

Effects of the Invention

According to the features of the facilitated $CO_2$ transport membrane and the method for the production thereof, facilitated $CO_2$ transport membranes with an improved level of $CO_2$ permeance and $CO_2$ selective permeability can be provided stably.

In addition, according to the features of the method and apparatus for separating $CO_2$, $CO_2$ can be selectively separated with high efficiency from a $CO_2$-containing mixed gas by using the facilitated $CO_2$ transport membrane having high $CO_2$ selective permeability.

BRIEF DESCRIPTION OF THE DRAWINGS

FIG. 3 is a table showing a list of constitutional conditions and membrane performance for separation-functional membranes of Examples 1 to 7 and Comparative Examples 1 and 2 used in experiments for evaluation of membrane performance of a facilitated $CO_2$ transport membrane according to the present invention.

FIG. 7 is a table showing a list of constitutional conditions and membrane performance for separation-functional membranes of Examples 8 and 9 and Comparative Example 3 used in experiments for evaluation of membrane performance of a facilitated $CO_2$ transport membrane according to the present invention.

DESCRIPTION OF EMBODIMENTS

Figure 1:
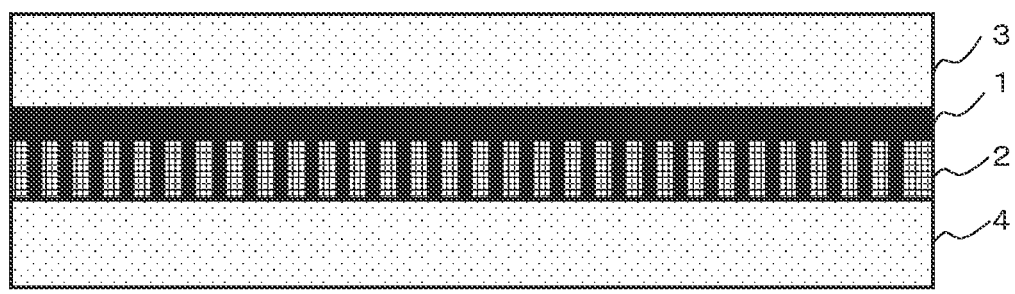
FIG. 1 is a sectional view schematically showing a structure in one embodiment of a facilitated $CO_2$ transport membrane according to the present invention.

By extensively conducting studies, the inventors of the present application have found that when a gel membrane of a facilitated $CO_2$ transport membrane, which contains a $CO_2$ carrier and in which a reaction of $CO_2$ with the $CO_2$ carrier as expressed by the above (Chemical Formula 2) occurs, contains a catalyst for a $CO_2$ hydration reaction as expressed by the above (Chemical Formula 1), one of elementary reactions of the above-mentioned reaction, the catalyst being capable of maintaining catalytic activity without being deactivated at a high temperature of 100° C. or higher, the $CO_2$ permeance is dramatically improved with respect to the $H_2$ permeance even at such a high temperature, and the $CO_2$ selective permeability is considerably improved as compared to a conventional facilitated $CO_2$ transport membrane that does not contain the catalyst (first new finding).

The inventors of the present application have further found that when formed using a gel membrane composed of a copolymer including a first structural unit derived from an acrylic acid cesium salt or an acrylic acid rubidium salt and a second structural unit derived from vinyl alcohol, the facilitated $CO_2$ transport membrane can have further improved $CO_2$ permeance and further improved $CO_2$ selective permeability as compared with conventional facilitated $CO_2$ transport membranes formed using a PVA/PAA sodium salt copolymer (second new finding).

The inventors of the present invention also have found that the two new findings are synergistically effective without interfering with each other so that the $CO_2$ permeance and the $CO_2$ selective permeability can be made higher than those obtained when each technique is preformed alone. Finally, based on the two new findings, the inventors of the present application have invented a facilitated $CO_2$ transport membrane, a method for the production thereof, a resin composition for use in the production method, a $CO_2$ separation module, and a method and an apparatus for separating $CO_2$, which will be described below.

First Embodiment

First, an embodiment of a facilitated $CO_2$ transport membrane, an embodiment of a method for the production thereof, and an embodiment of a resin composition for use in the production method, according to the present invention (hereinafter, referred to as "the present facilitated transport membrane," "the present production method," and "the present resin composition," respectively, as needed) will be described with reference to the drawings.

The present facilitated transport membrane is a facilitated $CO_2$ transport membrane including a separation-functional membrane that includes a water-containing hydrophilic polymer gel membrane containing a $CO_2$ carrier and a $CO_2$ hydration catalyst having catalytic activity at a temperature of 100° C. or higher, the facilitated $CO_2$ transport membrane having a high $CO_2$ permeance and a high $CO_2$ selective permeability. To stably exhibit a high $CO_2$ selective permeability, the present facilitated transport membrane further includes a hydrophilic porous membrane as a support membrane that supports the gel membrane containing the $CO_2$ carrier and the $CO_2$ hydration catalyst.

Specifically, the present facilitated transport membrane includes, as a material of the separation-functional membrane, a copolymer including a first structural unit derived from an acrylic acid cesium salt or an acrylic acid rubidium salt and a second structural unit derived from vinyl alcohol (hereinafter simply abbreviated as "the present copolymer"), and also includes, as the $CO_2$ carrier, for example, at least one of an alkali metal carbonate such as cesium carbonate ($Cs_2CO_3$) or rubidium carbonate ($Rb_2CO_3$), an alkali metal bicarbonate such as cesium bicarbonate ($CsHCO_3$) or rubidium bicarbonate ($RbHCO_3$), and an alkali metal hydroxide such as cesium hydroxide (CsOH) or rubidium hydroxide (RbOH), preferably an alkali metal carbonate or an alkali metal bicarbonate, more preferably cesium carbonate. The $CO_2$ hydration catalyst preferably includes an oxo acid compound. In particular, the $CO_2$ hydration catalyst preferably includes an oxo acid compound of at least one element selected from group 14 elements, group 15 elements, and group 16 elements. The $CO_2$ hydration catalyst may be, for example, at least one of a tellurous acid compound, a selenious acid compound, an arsenious acid compound, and an orthosilicic acid compound. More specifically, the $CO_2$ hydration catalyst may be potassium tellurite ($K_2TeO_3$, melting point: 465° C.), lithium tellurite ($Li_2O_3Te$, melting point: about 750° C.), potassium selenite ($K_2O_3Se$, melting point: 875° C.), sodium arsenite ($NaO_2As$, melting point: 615° C.), sodium orthosilicate ($Na_4O_4Si$, melting point: 1,018° C.), or the like. A tellurous acid compound is preferably used, and potassium tellurite is more preferably used.

All the $CO_2$ hydration catalysts used in this embodiment are soluble in water and extremely thermally stable with a melting point of 400° C. or higher, and have catalytic activity at a high temperature of 100° C. or higher. The melting point of the $CO_2$ hydration catalyst is only required to be higher than the upper limit of fluctuating temperatures in the steps of a method for producing the present facilitated transport membrane described later (e.g. the temperature in the medium removing step or the thermal crosslinking temperature). When the melting point is, for example, about 200° C. or higher, a situation can be avoided in which the $CO_2$ hydration catalyst is sublimed in the course of the production process so that the concentration of the $CO_2$ hydration catalyst in the separation-functional membrane decreases.

The first structural unit of the present copolymer is represented by the structural formula below (Chemical Formula 5). In Chemical Formula 5, M represents cesium or rubidium. The second structural unit of the present copolymer is represented by the structural formula below (Chemical Formula 6). Hereinafter, it will be assumed that the present copolymer is a copolymer composed of a polymer of the first structural unit (poly(acrylic acid cesium salt) or poly(acrylic acid rubidium salt)) and a polymer of the second structural unit (polyvinyl alcohol) (a PVA/PAA cesium salt copolymer or a PVA/PAA rubidium salt copolymer).

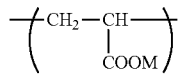
(Chemical Formula 5)

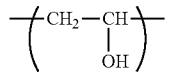
(Chemical Formula 6)

The present copolymer may further include an additional structural unit (hereinafter referred to as "the third structural unit" as needed) other than the first and second structural units. The total content of the first and second structural units is preferably from 40 mol % to 100 mol %, more preferably from 50 mol % to 100 mol %, even more preferably from 60 mol % to 100 mol %, with respect to the total content of all the structural units constituting the present copolymer. In the present copolymer, a content of the second structural unit is preferably from 1 mol % to 90 mol %, more preferably from 5 mol % to 85 mol %, even more preferably from 10 mol % to 80 mol %, with respect to the total content of the first and second structural units. In the present copolymer, the content of the second structural unit may be exemplified by, for example, from 1 mol % to 90 mol %, from 5 mol % to 85 mol %, from 10 mol % to 80 mol %, from 20 mol % to 80 mol %, from 30 mol % to 80 mol %, or from 40 mol % to 80 mol %, with respect to the total content of the first and second structural units.

The third structural unit may be, for example, a structural unit derived from a vinyl ester of a fatty acid of 2 to 16 carbon atoms, such as vinyl acetate, vinyl propionate, vinyl butyrate, vinyl laurate, vinyl caproate, vinyl stearate, vinyl palmitate, or vinyl versatate; a structural unit derived from an acrylic acid alkyl ester having an alkyl group of 1 to 16 carbon atoms, such as methyl acrylate, ethyl acrylate, propyl acrylate, butyl acrylate, hexyl acrylate, octyl acrylate, or lauryl acrylate; a structural unit derived from a methacrylic acid alkyl ester having an alkyl group of 1 to 16 carbon atoms, such as ethyl methacrylate, propyl methacrylate, butyl methacrylate, hexyl methacrylate, octyl methacrylate, or lauryl methacrylate; a structural unit derived from a maleic acid dialkyl ester having an alkyl group of 1 to 16 carbon atoms, such as dimethyl maleate, diethyl maleate, dibutyl maleate, dioctyl maleate, or dilauryl maleate; a structural unit derived from a fumaric acid dialkyl ester having an alkyl group of 1 to 16 carbon atoms, such as dimethyl fumarate, diethyl fumarate, dibutyl fumarate, dioctyl fumarate, or dilauryl fumarate; a structural unit derived from an itaconic acid dialkyl ester having an alkyl group of 1 to 16 carbon atoms, such as diethyl itaconate, dibutyl itaconate, dihexyl itaconate, dioctyl itaconate, or dilauryl itaconate; a structural unit derived from acrylic acid; or the like. The third structural unit is preferably a structural unit derived from a vinyl ester of a fatty acid of 2 to 16 carbon atoms or a structural unit derived from an acrylic acid alkyl ester having an alkyl group of 1 to 16 carbon atoms, more preferably a structural unit derived from a vinyl ester of a fatty acid of 2 to 4 carbon atoms or a structural unit derived from an acrylic acid alkyl ester having an alkyl group of 1 to 4 carbon atoms, even more preferably a structural unit derived from vinyl acetate or a structural unit derived from methyl acrylate.

The present resin composition includes the present copolymer, the $CO_2$ carrier, and the $CO_2$ hydration catalyst. A content of the $CO_2$ carrier is preferably form 20% by weight to 90% by weight, more preferably from 45% by weight to 85% by weight with respect to the total weight of the $CO_2$ carrier and the present copolymer. The $CO_2$ hydration catalyst is generally added in a content of 0.01 to 1 mole, preferably 0.02 to 0.5 moles, more preferably 0.025 to 0.5 moles per mole of the $CO_2$ carrier.

The present resin composition can be produced by a method including the step of mixing the present copolymer, the $CO_2$ carrier, and the $CO_2$ hydration catalyst. In this mixing step, water is preferably further added as a medium. When water is added, the amount of water added is preferably such that the resultant resin composition can be in the form of a uniform solution when used as a coating liquid as described later. The mixing order is not limited, and the mixing temperature is preferably in the range of 5° C. to 90° C.

As an example, the present facilitated transport membrane is configured as a three-layer structure in which a hydrophilic porous membrane 2 supporting a separation-functional membrane 1 is held between two hydrophobic porous membranes 3 and 4 as schematically shown in FIG. 1. The separation-functional membrane 1 as a gel membrane is supported by the hydrophilic porous membrane 2 and has a certain level of mechanical strength, and therefore is not necessarily required to be held between the two hydrophobic porous membranes 3 and 4. The mechanical strength can also be increased by, for example, forming the hydrophilic porous membrane 2 in a cylindrical shape. Therefore, the present facilitated transport membrane is not necessarily a flat plate-shaped one.

In the separation-functional membrane, a content of the present copolymer should be from about 10% by weight to about 80% by weight with respect to the total weight of the present copolymer and the $CO_2$ carrier, and a content of the $CO_2$ carrier should be from about 20% by weight to about 90% by weight with respect to the total weight of the present copolymer and the $CO_2$ carrier.

Further, the separation-functional membrane contains the $CO_2$ hydration catalyst, for example, in a content of not less than 0.01 times and not more than 1 time, preferably not less than 0.02 times and not more than 0.5 times, further preferably not less than 0.025 times and not more than 0.5 times the content of the $CO_2$ carrier in terms of molar number.

The hydrophilic porous membrane preferably has heat resistance to a temperature of 100° C. or higher, mechanical strength and adhesion with the separation-functional membrane (gel membrane) in addition to hydrophilicity, and preferably has a porosity (void ratio) of 55% or more and a pore size falling within a range of 0.1 µm to 1 µm. In this embodiment, a hydrophilized tetrafluoroethylene polymer (PTFE) porous membrane is used as a hydrophilic porous membrane that satisfies the above-mentioned requirements.

The hydrophobic porous membrane preferably has heat resistance to a temperature of 100° C. or higher, mechanical strength and adhesion with the separation-functional membrane (gel membrane) in addition to hydrophobicity, and preferably has a porosity (void ratio) of 55% or more and a pore size falling within a range of 0.1 µm to 1 µm. In this embodiment, a non-hydrophilized tetrafluoroethylene polymer (PTFE) porous membrane is used as a hydrophobic porous membrane that satisfies the above-mentioned requirements.

Figure 2:
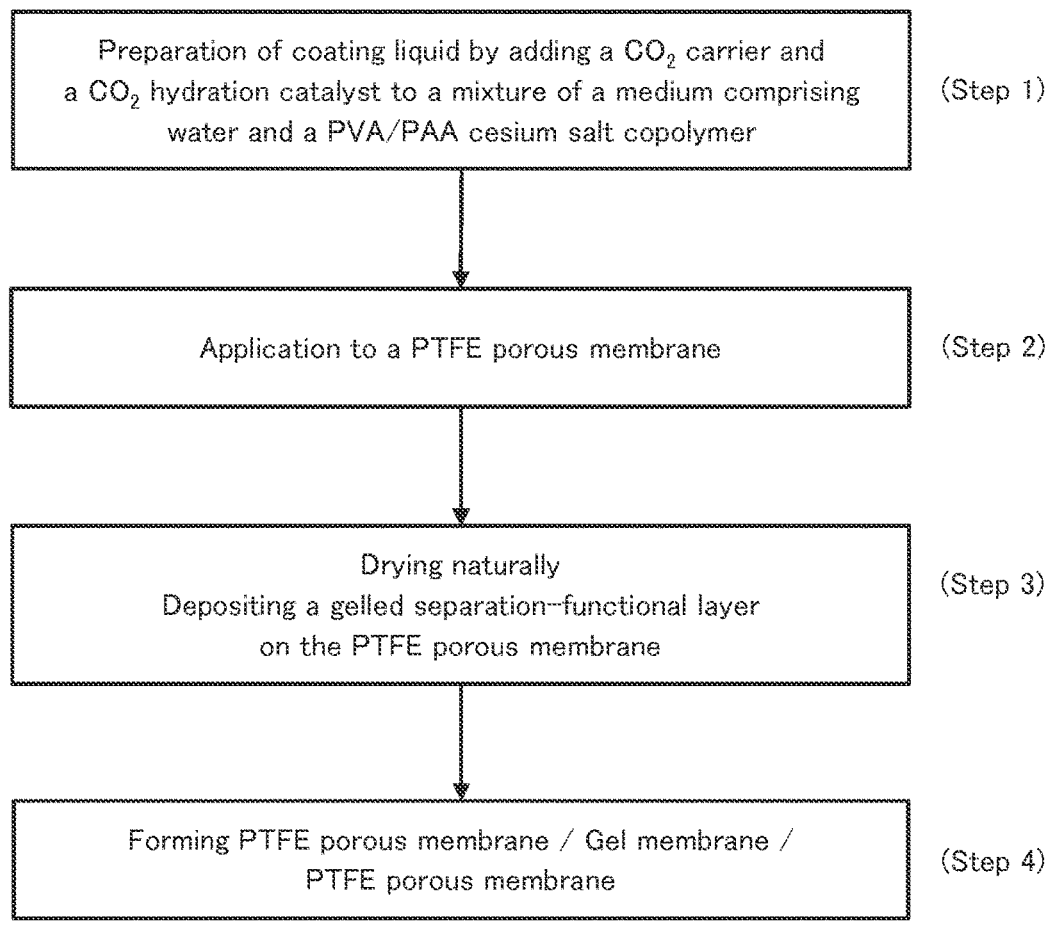
FIG. 2 is a flow chart showing an example of a method for producing a facilitated $CO_2$ transport membrane according to the present invention.

One embodiment of a method for producing the present facilitated transport membrane (the present production method) will now be described with reference to FIG. 2. The following descriptions are based on the assumption that a PVA/PAA cesium salt copolymer is used as the present copolymer, cesium carbonate ($Cs_2CO_3$) is used as the $CO_2$ carrier, and a tellurite (e.g. potassium tellurite ($K_2TeO_3$)) is used as the $CO_2$ hydration catalyst. The contents of the hydrophilic polymer, the $CO_2$ carrier and the $CO_2$ hydration catalyst are illustrative, and show contents used in sample preparation in examples described below.

First, a coating liquid, corresponding to the present resin composition including the present copolymer, the $CO_2$ carrier, and the $CO_2$ hydration catalyst, is prepared (step 1). More specifically, 2 g of a PVA/PAA cesium salt copolymer prepared by the present copolymer-producing method described below, 4.67 g of cesium carbonate, and a tellurite in a number of moles 0.025 times the number of moles of cesium carbonate are added to 80 g of water and mixed by stirring to form a coating liquid.

Next, the coating liquid obtained in step 1 is applied to a hydrophilic PTFE porous membrane side surface of a layered porous membrane by an applicator (step 2). The layered porous membrane is obtained by joining two membranes: a hydrophilic PTFE porous membrane (e.g. WPW-020-80 manufactured by SUMITOMO ELECTRIC FINE POLYMER, INC.; thickness: 80 µm; pore size: 0.2 µm; void ratio: about 75%) and a hydrophobic PTFE porous membrane (e.g. FLUOROPORE FP010 manufactured by SUMITOMO ELECTRIC FINE POLYMER, INC.; thickness: 60 µm; pore size: 0.1 µm; void ratio: 55%). The thickness of the coating is 500 µm in the samples of Examples 1 to 7 and Comparative Examples 1 and 2 described later, where the coating liquid is applied once. In this process, the coating liquid penetrates pores in the hydrophilic PTFE porous membrane, but is inhibited from penetrating at the boundary surface of the hydrophobic PTFE porous membrane, so that the coating liquid does not permeate to the opposite surface of the layered porous membrane, and there is no coating liquid on the hydrophobic PTFE porous membrane side surface of the layered porous membrane. This makes handling easy.

Next, the coated hydrophilic PTFE porous membrane is naturally dried at room temperature so that a separation-functional layer in the form of a gel is deposited on the hydrophilic PTFE porous membrane (step 3). In this case, the separation-functional layer in the form of a gel is a solid separation-functional membrane clearly distinguishable from a liquid membrane.

In the present production method, the coating liquid is applied to the hydrophilic PTFE porous membrane side surface of the layered porous membrane in step 2, and therefore, in step 3, the separation-functional membrane is not only formed on the surface (coated surface) of the hydrophilic PTFE porous membrane but also formed so as to fill pores, so that defects (minute defects such as pinholes) are less likely to occur, which leads to an increase in the success rate of the separation-functional membrane production. In step 3, it is desirable to further thermally crosslink the naturally dried PTFE porous membrane at a temperature of 80° C. to 160° C., preferably about 120° C., for a time period of 10 minutes to 4 hours, preferably about 2 hours. All of the samples in examples and comparative examples described later are thermally crosslinked.

Next, a hydrophobic PTFE porous membrane identical to the hydrophobic PTFE porous membrane of the layered porous membrane used in step 2 is superimposed on a gel layer side surface of the hydrophilic PTFE porous membrane obtained in step 3 to obtain the present facilitated transport membrane of three layer structure including a hydrophobic PTFE porous membrane/a separation-functional membrane supported by a hydrophilic PTFE porous membrane/a hydrophobic PTFE porous membrane as schematically shown in FIG. 1 (step 4). FIG. 1 schematically and linearly shows a state in which the separation-functional membrane 1 fills pores of the hydrophilic PTFE porous membrane 2.

In the present production method, the blending ratio of the $CO_2$ carrier and the $CO_2$ hydration catalyst can be adjusted in step 1 of producing a coating liquid, and therefore, as compared to a case where after formation of a gel membrane that does not contain at least one of the $CO_2$ carrier and the $CO_2$ hydration catalyst, at least one of the $CO_2$ carrier and the $CO_2$ hydration catalyst is added into the gel membrane, adjustment of the blending ratio can be more accurately and easily performed, leading to enhancement of membrane performance.

Thus, the present facilitated transport membrane prepared by following steps 1 to 4 can exhibit extremely high selective permeability to hydrogen even at a high temperature of 100° C. or higher, for example a $CO_2$ permeance of about $3\times10^{-5}$ mol/(m²·s·kPa) (=90 GPU) or more and a $CO_2/H_2$ selectivity of about 100 or more.

Next, a method for producing the present copolymer will be described. The present copolymer can be obtained by, for example, a production method including the step of saponifying, with cesium hydroxide or rubidium hydroxide, a copolymer including a structural unit derived from an acrylic acid alkyl ester and a structural unit derived from a fatty acid vinyl ester (step A).

The present copolymer-producing method may further include the step of polymerizing at least an acrylic acid alkyl ester and a fatty acid vinyl ester to form the copolymer for use in step A (step a).

The acrylic acid alkyl ester may be an acrylic acid alkyl ester having an alkyl group of 1 to 16 carbon atoms, and the fatty acid vinyl ester may be a vinyl ester of a fatty acid of 2 to 16 carbon atoms. They may be polymerized according to, for example, the method described in Japanese Patent Application Publication NO. 52-107096 and Japanese Patent Application Publication NO. 52-27455.

In step A, the saponification is preferably performed in the presence of water and/or a water-soluble organic solvent (e.g., a C1 to C3 alcohol solvent). The saponification temperature is preferably in the range of 20° C. to 80° C., more preferably in the range of 25° C. to 75° C.

In step A, the structural unit derived from the acrylic acid alkyl ester is saponified to the first structural unit, and the structural unit derived from the fatty acid vinyl ester is saponified to the second structural unit. Therefore, when the degree of saponification is controlled or when neutralization is performed after the saponification, the present copolymer can contain, as the third structural unit, a structural unit derived from the fatty acid vinyl ester, a structural unit derived from the acrylic acid alkyl ester, or a structural unit derived from acrylic acid.

It will be understood that in step a, the amount of a compound (other than the fatty acid vinyl ester and the acrylic acid alkyl ester) used to derive the third structural unit, the degree of polymerization, or other factors may also be controlled so that the present copolymer can contain the third structural unit.

As described above, conditions for step A or step a may be appropriately selected so that the content of the first and second structural units can be controlled in the above range.

Hereinafter, specific performance of the present facilitated transport membrane is evaluated by comparing the performance of each of the membranes of Examples 1 to 7 and Comparative Examples 1 and 2. In Examples 1 to 7, the present copolymer (PVA/PAA cesium salt copolymer) is used as a hydrophilic polymer to form a separation-functional membrane, and a $CO_2$ hydration catalyst is contained in the separation-functional membrane. In Comparative Examples 1 and 2, a PVA/PAA sodium salt copolymer, in which the alkali metal used to form the acrylate differs from that in the present copolymer, is used as a hydrophilic polymer, and no $CO_2$ hydration catalyst is contained in the separation-functional membrane.

A PVA/PAA cesium salt copolymer, corresponding to the present polymer, used in Examples 1 to 7 was produced according to the procedures shown in Synthesis Example 1 and Production Example 1 below.

(Synthesis Example 1) Synthesis of Vinyl Acetate-Methyl Acrylate Copolymer

A 2-L-volume reaction vessel equipped with a stirrer, a thermometer, a $N_2$ gas inlet tube, a reflux condenser, and dropping funnels was charged with 768 g of water and 12 g of anhydrous sodium sulfate, and the air in the system was replaced by $N_2$ gas. The vessel was then charged with 1 g of partially saponified polyvinyl alcohol (88% in saponification degree) and 1 g of lauryl peroxide. After the internal temperature was raised to 60° C., 104 g (1.209 mol) of methyl acrylate and 155 g (1.802 mol) of vinyl acetate as monomers were each simultaneously added dropwise from a dropping funnel for each monomer over 4 hours. During the dropwise addition, the internal temperature was kept at 60° C. at a stirring rate of 600 rpm. After the dropwise addition was completed, the mixture was further stirred for 2 hours at an internal temperature of 65° C. The resultant mixture was then dewatered by centrifugation, so that 288 g of a vinyl acetate-methyl acrylate copolymer (with a water content of 10.4%) was obtained.

(Production Example 1) Production of PVA/PAA Cesium Salt Copolymer

A 2-L-volume reaction vessel equipped with a stirrer, a thermometer, a $N_2$ gas inlet tube, a reflux condenser, and dropping funnels was charged with 500 g of methanol, 410 g of water, 554.2 g (3.3 mol) of cesium hydroxide monohydrate, and 288 g of the vinyl acetate-methyl acrylate copolymer (with a water content of 10.4%) obtained in Synthesis Example 1. The mixture was subjected to saponification under 400 rpm stirring at 30° C. for 3 hours. After the saponification was completed, the resultant reaction mixture was washed three times with 600 g of methanol, filtered, and dried at 70° C. for 6 hours to give 308 g of a vinyl alcohol-cesium acrylate copolymer. Subsequently, 308 g of the vinyl alcohol-cesium acrylate copolymer was pulverized with a jet mill (LJ manufactured by Nippon Pneumatic Mfg. Co., Ltd.), so that 280 g of fine powder of the vinyl alcohol-cesium acrylate copolymer was obtained.

The samples in Examples 1 to 7 and Comparative Examples 1 and 2 below were each prepared in accordance with the present production method described above. The weight of each of water, the hydrophilic polymer, and the $CO_2$ carrier in the coating liquid prepared in step 1 was as follows. In Examples 1 to 3 and 7 and Comparative Examples 1 and 2, 80 g of water was mixed with 2 g of the hydrophilic polymer and 4.67 g of the $CO_2$ carrier. In Examples 4 to 6, 80 g of water was mixed with 3 g of the hydrophilic polymer and 7 g of the $CO_2$ carrier. In all Examples 1 to 7 and Comparative Examples 1 and 2, the weight ratio of the hydrophilic polymer to the $CO_2$ carrier is 3:7.

In Examples 1 to 7, the PVA/PAA cesium salt copolymer with no third structural unit was used as the hydrophilic polymer. In Comparative Examples 1 and 2, a PVA/PAA sodium salt copolymer without any structural unit other than those derived from the acrylic acid salt and vinyl alcohol was used as the hydrophilic polymer. In all Examples 1 to 7 and Comparative Examples 1 and 2, the content of the acrylic acid salt in the hydrophilic polymer is 40 mol % with respect to the total content of the copolymer. The $CO_2$ carrier used was cesium carbonate ($Cs_2CO_3$) except for that used in Example 7 and Comparative Example 2. Rubidium carbonate ($Rb_2CO_3$) was used as the $CO_2$ carrier in Example 7 and Comparative Example 2.

Potassium tellurite was used as the $CO_2$ hydration catalyst in Examples 1 to 4 and 7, and sodium arsenite and potassium selenite were used as the $CO_2$ hydration catalyst in Examples 5 and 6, respectively. The molar ratio of the $CO_2$ hydration catalyst to the $CO_2$ carrier is 0.025 times in Examples 1 and 4 to 6, 0.1 times in Example 2, 0.2 times in Example 3, and 0.05 times in Example 7.

The sample in Comparative Example 1 was prepared as in Example 1, except that the coating liquid prepared in step 1 of the above production method contained no $CO_2$ hydration catalyst and that the hydrophilic polymer in the coating liquid was the sodium salt. The sample in Comparative Example 2 was prepared as in Example 7, except that the coating liquid prepared in step 1 of the above production method contained no $CO_2$ hydration catalyst and that the hydrophilic polymer in the coating liquid was the sodium salt.

An experiment method for evaluating membrane performance of the samples in Examples 1 to 7 and Comparative Examples 1 and 2 will now be described.

Each sample was used while being fixed between a feed side chamber and a permeate side chamber in a stainless steel flow type gas permeation cell using a fluororubber gasket as a seal material. Experimental conditions are the same for the samples, and the temperature of the inside of the cell (hereinafter, referred to as "the treatment temperature") is fixed at 130° C.

The feed side gas supplied to the feed side chamber is a mixed gas including $CO_2$, $H_2$ and $H_2O$ (steam), and the ratio (mol %) among them is $CO_2:H_2:H_2O=23.6:35.4:41.0$. The flow rate of the feed side gas is $3.47\times10^{-2}$ mol/min, and the feed side pressure is 600 kPa (A). (A) means an absolute pressure. Accordingly, the $CO_2$ partial pressure on the feed side is 142 kPa (A). The pressure of the feed side chamber is adjusted with a back pressure regulator provided on the downstream side of a cooling trap at some midpoint in a retentate gas discharging passage.

On the other hand, the pressure of the permeate side chamber is atmospheric pressure, $H_2O$ (steam) is used as a sweep gas made to flow into the permeate side chamber, and the flow rate thereof is $7.77\times10^{-3}$ mol/min. For sending the sweep gas discharged from the permeate side chamber to a gas chromatograph on the downstream side, an Ar gas is inpoured, steam in the gas containing the Ar gas is removed by the cooling trap, the composition of the gas after passing through the cooling trap is quantitatively determined by the gas chromatograph, the permeance [mol/($m^2 \cdot s \cdot kPa$)] of each of $CO_2$ and $H_2$ is calculated from the composition and the flow rate of Ar in the gas, and from the ratio thereof, the $CO_2/H_2$ selectivity is calculated.

In the evaluation experiment described above, the experiment apparatus has a pre-heater for heating the gas and the flow type gas permeation cell with a sample membrane fixed therein is placed in a thermostatic oven in order to keep constant the use temperature of the facilitated transport membrane of each sample and the temperatures of the feed side gas and the sweep gas.

Next, a comparison is made of the membrane performance obtained as a result of experiments in Examples 1 to 7 and Comparative Examples 1 and 2. FIG. 3 shows a list of constitutional conditions (the $CO_2$ carrier, the $CO_2$ hydration catalyst, the molar ratio of the $CO_2$ carrier to the $CO_2$ hydration catalyst, the hydrophilic polymer, and the concentrations of the hydrophilic polymer and the $CO_2$ carrier in the coating liquid) and membrane performance ($CO_2$ permeance, $H_2$ permeance, and $CO_2/H_2$ selectivity) for the separation-functional membrane samples in Examples 1 to 7 and Comparative Examples 1 and 2. Note that the concentrations (wt %) of the hydrophilic polymer and the $CO_2$ carrier shown in FIG. 3 are approximate values calculated without taking into account the weight of the $CO_2$ hydration catalyst in the coating liquid.

Figure 4:
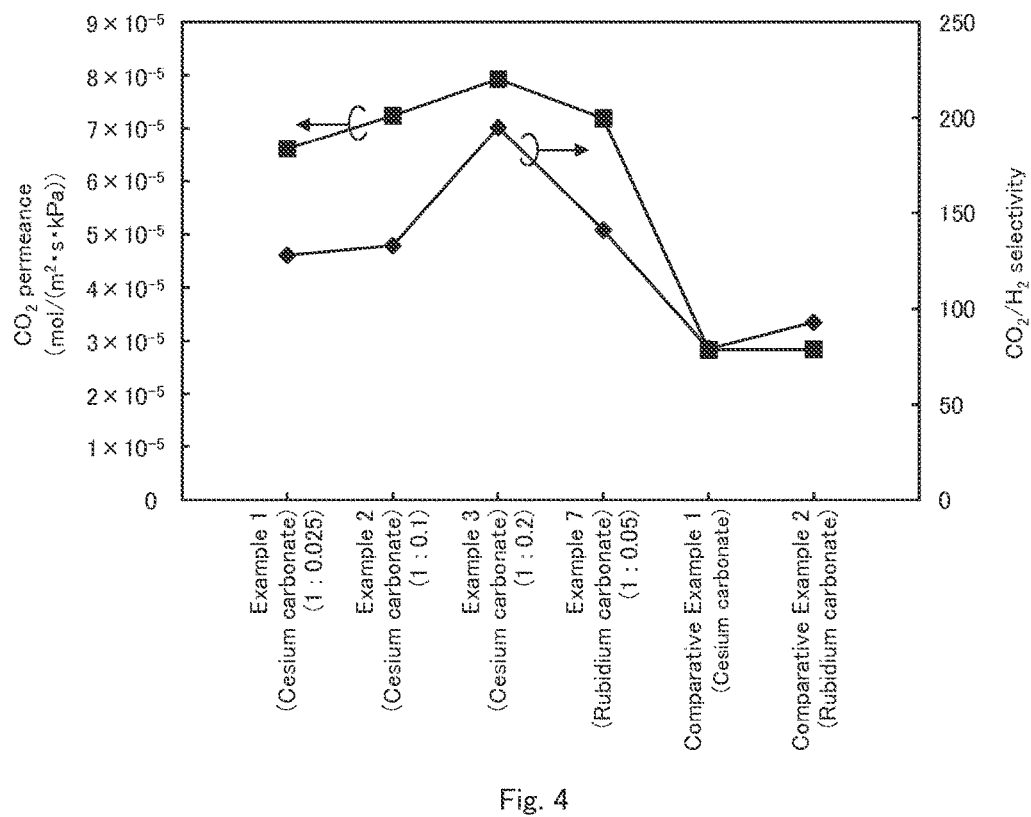
FIG. 4 is a graph showing a $CO_2$ permeance and a $CO_2/H_2$ selectivity in Examples 1 to 3 and 7 and Comparative Examples 1 and 2 shown in FIG. 3.

First, the membrane performance is compared among Examples 1 to 3 and 7 and Comparative Examples 1 and 2. The comparison of the membrane performance is made with respect to the difference in hydrophilic polymer, the presence or absence of the $CO_2$ hydration catalyst, and the difference in the content of the $CO_2$ hydration catalyst. FIG. 4 shows, in the form of a graph, the $CO_2$ permeance and $CO_2/H_2$ selectivity in Examples 1 to 3 and 7 and Comparative Examples 1 and 2. FIGS. 3 and 4 show the following. When the present copolymer is used as the hydrophilic polymer and the separation-functional membrane contains the $CO_2$ hydration catalyst in the case where the $CO_2$ carrier is cesium carbonate, the $CO_2$ permeance increases by a factor of 2.34 to 2.80 while the $H_2$ permeance increases by a factor of 1.14 to 1.52, and the increasing rate of $CO_2$ permeance is greater than that of $H_2$ permeance, so that the $CO_2/H_2$ selectivity is significantly improved to be 128 to 195 (1.62 to 2.46 times in terms of the increasing rate) as compared to a $CO_2/H_2$ selectivity of 79.2 in Comparative Example 1. Also in the case where the $CO_2$ carrier is rubidium carbonate, the $CO_2$ permeance increases by a factor of 2.53 while the $H_2$ permeance increases by a factor of 1.67, and the increasing rate of $CO_2$ permeance is greater than that of $H_2$ permeance, so that the $CO_2/H_2$ selectivity is significantly improved to be 141 (1.51 times in terms of the increasing rate) as compared to a $CO_2/H_2$ selectivity of 93.1 in Comparative Example 2.

A comparison among Examples 1 to 3 with reference to FIGS. 3 and 4 shows that as the mixing ratio (molar ratio) of the $CO_2$ hydration catalyst to the $CO_2$ carrier increases, the $CO_2$ permeance tends to increase, and even when the molar ratio is 0.025, the increase in the $CO_2$ permeance and the improvement of the $CO_2/H_2$ selectivity are apparent. A comparison between Examples 1 and 7 shows that the difference in the $CO_2$ carrier used does not make a significant difference in the increase in the $CO_2$ permeance or the improvement of the $CO_2/H_2$ selectivity.

Figure 5:
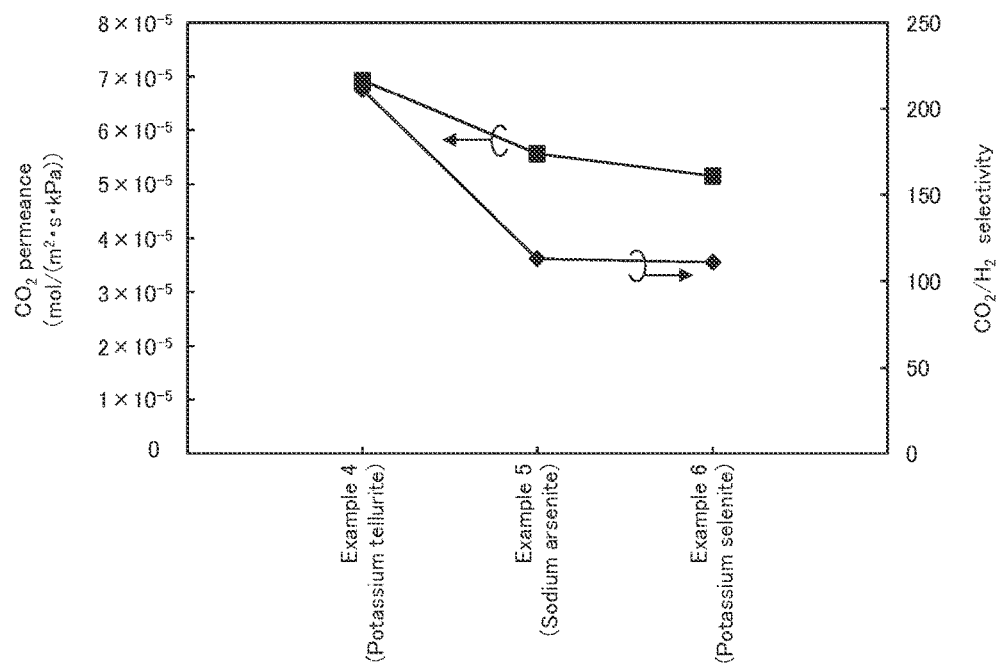
FIG. 5 is a graph showing a $CO_2$ permeance and a $CO_2/H_2$ selectivity in Examples 4 to 6 shown in FIG. 3.

Next, the membrane performance is compared among Examples 4 to 6. The comparison of the membrane performance is made with respect to the type of the $CO_2$ hydration catalyst. FIG. 5 shows, in the form of a graph, the $CO_2$ permeance and the $CO_2/H_2$ selectivity in Examples 4 to 6. FIGS. 3 and 5 show that while all of the $CO_2$ hydration catalysts are found to improve both the $CO_2$ permeance and the $CO_2/H_2$ selectivity, the $CO_2$ permeance is remarkably improved using a tellurite.

Figure 6:
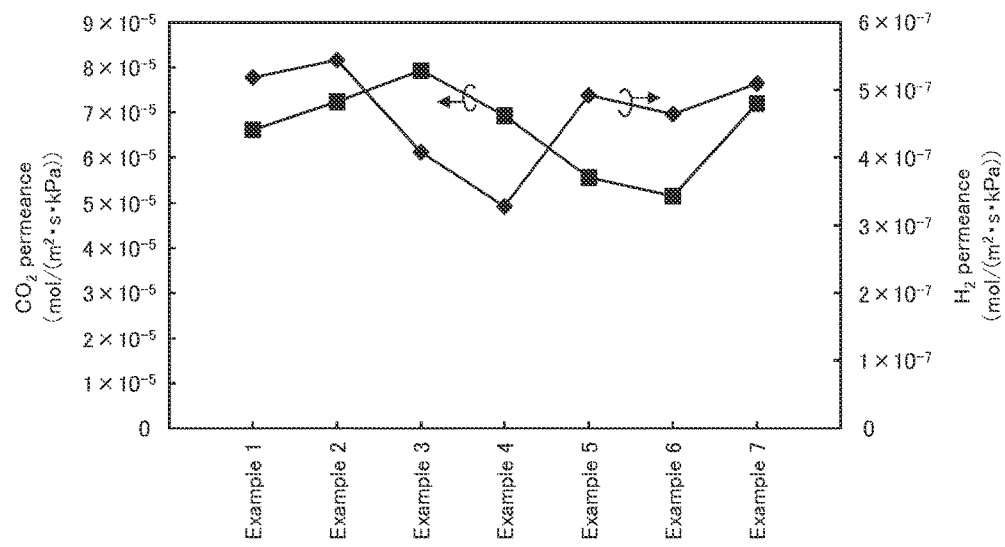
FIG. 6 is a graph showing a $CO_2$ permeance and a $H_2$ permeance in Examples 1 to 7 shown in FIG. 3.

Next, the membrane performance is compared among Examples 1 to 7. Specifically, a comparison of the membrane performance between Examples 1 and 4 is made with respect to the difference in the concentrations of the hydrophilic polymer and the $CO_2$ carrier in the coating liquid produced in step 1 described above. FIG. 6 shows, in the form of a graph, the $CO_2$ permeance and the $H_2$ permeance in Examples 1 to 7. Example 4 is the same as Example 1 in the hydrophilic polymer, the $CO_2$ hydration catalyst, and the mixing ratio thereof, but differs from Example 1 in that the total weight of the hydrophilic polymer and the $CO_2$ carrier in the coating liquid in Example 4 is 1.5 times that in Example 1. Note that the concentration (wt %) of the hydrophilic polymer and the $CO_2$ carrier in the coating liquid in Example 4 is about 1.44 times that in Example 1.

First, a comparison between Examples 1 and 4 with reference to FIGS. 3 and 6 shows that the $CO_2$ permeance in Example 1 ($6.61\times10^{-5}$ mol/($m^2 \cdot s \cdot kPa$)) and the $CO_2$ permeance in Example 4 ($6.93\times10^{-5}$ mol/($m^2 \cdot s \cdot kPa$)) are almost the same, with a difference of only few %, but the $H_2$ permeance in Example 4 ($3.28\times10^{-7}$ mol/($m^2 \cdot s \cdot kPa$)) is smaller than the $H_2$ permeance in Example 1 ($5.18\times10^{-7}$ mol/($m^2 \cdot s \cdot kPa$)). Therefore, Example 4 is superior in $CO_2/H_2$ selectivity to Example 1.

The $CO_2$ permeation mechanism is a facilitated transport mechanism. Therefore, no significant difference in $CO_2$ permeance occurs between Examples 1 and 4 because they are the same in the hydrophilic polymer, the type and concentration of the $CO_2$ carrier in the gel membrane, and the type and mixing ratio of the $CO_2$ hydration catalyst, namely, they are the same in major factors capable of influencing the $CO_2$ permeance. On the other hand, since $H_2$ does not react with the $CO_2$ carrier, the $H_2$ permeation mechanism is not a facilitated transport mechanism but a solution-diffusion mechanism. A comparison of the $H_2$ permeance between Examples 1 and 4 suggests that the difference may be influenced by individual differences (fluctuations in production) in the quality of the hydrophilic polymer gel membrane.

In this case, the concentration of the hydrophilic polymer in the coating liquid in Example 4 is 1.5 times that in Example 1. Therefore, the thickness of the gel membrane in Example 4 should be larger than that in Example 1, depending on the difference in the concentration, and taking into account the $H_2$ permeation mechanism, the difference in $H_2$ permeance between Examples 1 and 4 may be influenced by the difference in the thickness of the gel membrane. However, the $H_2$ permeance in Examples 5 and 6, where the concentration of the hydrophilic polymer in the coating liquid is the same as that in Example 4, is greater than that in Example 3, where the concentration of the hydrophilic polymer in the coating liquid is the same as that in Example 1. Therefore, the variations in $H_2$ permeance should mainly result from individual differences in the quality of the gel membrane. The average $H_2$ permeance in Examples 4 to 6, where the concentration of the hydrophilic polymer in the coating liquid is 1.5 times that in Examples 1 to 3 and 7, is $4.28 \times 10^{-7}$ mol/($m^2 \cdot s \cdot kPa$), whereas the average $H_2$ permeance in Examples 1 to 3 and 7 is $4.94 \times 10^{-7}$ mol/($m^2 \cdot s \cdot kPa$), which is about 16% greater than that in Examples 4 to 6. Therefore, there is room to suppress the increase in $H_2$ permeance by controlling the concentration of the hydrophilic polymer in the coating liquid.

According to the present facilitated transport membrane, the separation-functional membrane includes the $CO_2$ hydration catalyst and the present copolymer as a hydrophilic polymer. As shown above, these features allow a two-stage increase in $CO_2$ permeance and thus make it possible to obtain a $CO_2/H_2$ selectivity of 100 or more. In addition, when the increase or variations in $H_2$ permeance is suppressed by controlling the weight content of the present copolymer in the coating liquid, a $CO_2/H_2$ selectivity equal to or higher than that in Example 4 can be achieved.

In Examples 1 to 7 and Comparative Examples 1 and 2 shown above, the coating liquid was applied once to the surface of the porous membrane in step 2 of the method for producing the present facilitated transport membrane, and the coating thickness was 500 μm. Examples 8 and 9 and Comparative Example 3 were also performed, in which the application was performed twice to increase the coating thickness, and the membrane performance was evaluated by the procedure described below.

The constitutional conditions and the production method for the separation-functional membrane in Examples 8 and 9 are the same as those in Example 1 except for the number of times of the application of the coating liquid. The constitutional conditions and the production method for the separation-functional membrane in Comparative Example 3 are the same as those in Comparative Example 1 except for the number of times of the application of the coating liquid.

The membrane performance in Example 8 was evaluated under an experimental condition (condition B) different from that (condition A) in Examples 1 to 7, and the membrane performance in Example 9 and Comparative Example 3 was evaluated under another experimental condition (condition C) different from that in Examples 1 to 7. The evaluation experiments under conditions B and C were performed using a mixed gas of $CO_2$, $N_2$, and $H_2O$ (steam) as the feed side gas, in which nitrogen is used instead of hydrogen. Under conditions B and C, therefore, $CO_2$ and $N_2$ permeance [mol/($m^2 \cdot s \cdot kPa$)] and $CO_2/N_2$ selectivity are evaluated for the membrane performance. In this case, the feed side pressure under conditions B and C is 600 kPa (A), which is the same as that under condition A, and the content (mol %) of $CO_2$ in the mixed gas under conditions B and C is set at 23.6%, which is also the same as that under condition A. Therefore, the $CO_2$ partial pressure on the feed side under conditions B and C is 142 kPa (A), which is also the same as that under condition A.

The experimental conditions for condition B are the same as those for condition A, except that nitrogen is used as one component of the feed side gas instead of hydrogen. The treatment temperature 130° C. under condition B differs from the treatment temperature 110° C. under condition C.

FIG. 7 shows a list of constitutional conditions (the $CO_2$ carrier, the $CO_2$ hydration catalyst, the molar ratio of the $CO_2$ carrier to the $CO_2$ hydration catalyst, the hydrophilic polymer conditions, the concentrations of the hydrophilic polymer and the $CO_2$ carrier in the coating liquid, and the number of times of the application), the treatment temperature, and the membrane performance ($CO_2$ permeance, $N_2$ permeance, and $CO_2/N_2$ selectivity) for the separation-functional membrane sample in each of Examples 8 and 9 and Comparative Example 3.

Referring to FIG. 7, a comparison of the evaluation results in Examples 8 and 9 shows that as the treatment temperature decreases, both the $CO_2$ permeance and the $N_2$ permeance decreases, but the $CO_2/N_2$ selectivity increases because the $N_2$ permeance decreases more.

The samples in Example 9 and Comparative Example 3, where the membrane performance is evaluated under condition C, differ in the constitutional conditions and production method for the separation-functional membrane. Specifically, the sample in Comparative Example 3 is prepared as in Example 9, except that the coating liquid prepared in step 1 of the production method contains no $CO_2$ hydration catalyst and that the hydrophilic polymer in the coating liquid is a sodium salt. These differences are the same as those between the samples in Example 1 and Comparative Example 2. Referring to FIG. 7, a comparison of the evaluation results in Example 9 and Comparative Example 3 shows that the $CO_2$ permeance is higher in Example 9, where the hydrophilic polymer is a cesium salt and the $CO_2$ hydration catalyst is present, than in Comparative Example 3, and there is no significant difference in $N_2$ permeance between them, so that the $CO_2/N_2$ selectivity is improved in Example 9.

While all of the separation-functional membranes in Examples 1 to 9 and Comparative Examples 1 to 3 are gel membranes, Comparative Example 4 having a liquid membrane (aqueous solution) as a separation-functional membrane was prepared as another comparative example. The aqueous solution of a separation-functional membrane in Comparative Example 4 does not contain the PVA/PAA salt copolymer used in Examples 1 to 9 and Comparative Examples 1 to 3. In Comparative Example 4, cesium carbonate was used as a $CO_2$ carrier and potassium tellurite was used as a $CO_2$ hydration catalyst similarly to Example 1. Hereinafter, a method for preparing Comparative Example 4 will be described.

To an aqueous cesium carbonate solution having a molar concentration of 2 mol/L was added potassium tellurite in a content of 0.025 times the content of cesium carbonate in terms of molar number, and the resultant mixture was stirred until potassium tellurite was dissolved, thereby obtaining an aqueous solution for a separation-functional membrane (liquid membrane). Thereafter, instead of the application method using an applicator in step 2 in the present production method, a hydrophilic PTFE porous membrane was immersed in the aqueous solution for a separation-functional membrane (liquid membrane) for 30 minutes, and the hydrophilic PTFE membrane soaked with the aqueous solution was then placed on a hydrophobic PTFE membrane, and dried at room temperature for half a day or longer. Similarly to Examples 1 to 9 and Comparative Examples 1 to 3, another hydrophobic PTFE membrane is placed on the hydrophilic PTFE membrane to form a three-layer structure with the hydrophilic PTFE porous membrane and the separation-functional membrane (liquid membrane) held between the hydrophobic PTFE membranes at the time of an experiment for evaluation of membrane performance.

However, in the case of the liquid membrane sample of Comparative Example 4, it was impossible to set the feed side pressure of 600 kPa (A), i.e. an experimental condition similar to that in Examples 1 to 9 and Comparative Examples 1 to 3, and membrane performance could not be evaluated. That is, it became evident that a necessary differential pressure cannot be maintained because the difference in pressure between the feed side and the permeate side in the separation-functional membrane (liquid membrane) cannot be endured.

In Examples 1 to 7, $CO_2$ permeance, $H_2$ permeance, $CO_2/H_2$ selectivity are evaluated for the specific performance of the present facilitated transport membrane, and improvements in $CO_2$ permeance and selective permeability of $CO_2$ to hydrogen are successfully demonstrated. Also when a mixed gas containing nitrogen, methane, or other non-hydrogen gas with a molecular weight higher than that of hydrogen is used as the feed side gas and supplied to the feed side chamber, higher $CO_2$ selective permeability can be, of course, achieved as is apparent from the evaluation results in Example 9 and Comparative Example 3, because the mechanism for the permeation of nitrogen or other gas with a higher molecular weight is not a facilitated transport mechanism but a solution-diffusion mechanism.

Second Embodiment

Next, a description will be given of a $CO_2$ separation membrane module, a $CO_2$ separation apparatus, and a $CO_2$ separation method, which are designed to use the facilitated $CO_2$ transport membrane shown in the first embodiment.

The present facilitated transport membrane is preferably used to form a $CO_2$ separation membrane module. A $CO_2$ separation apparatus according to this embodiment includes the facilitated $CO_2$ transport membrane or the $CO_2$ separation membrane module, a gas supply unit configured to supply a $CO_2$-containing mixed gas to the facilitated $CO_2$ transport membrane, and a gas separation unit configured to separate from the mixed gas $CO_2$ having permeated the facilitated $CO_2$ transport membrane.

Examples of the type of the $CO_2$ separation membrane module include a spiral type, a cylindrical type, a hollow fiber type, a pleated type, a plate-and-frame type, and the like. The facilitated $CO_2$ transport membrane of the present invention may also be used in a process combined with a decarbonation technique such as chemical absorption, adsorption, or cryogenic separation. Examples include an apparatus for separating and collecting $CO_2$ by using a combination of membrane separation and chemical absorption as described in U.S. Pat. No. 4,466,946; and an apparatus for separating and collecting gas by a membrane-absorption hybrid method, in which an absorbing liquid is used in combination with a membrane, as described in Japanese Patent Application Publication NO. 2007-297605.

Hereinafter, a $CO_2$ separation apparatus including a cylindrical $CO_2$ separation membrane module will be described with reference to FIGS. 8A and 8B.

Figure 8A:
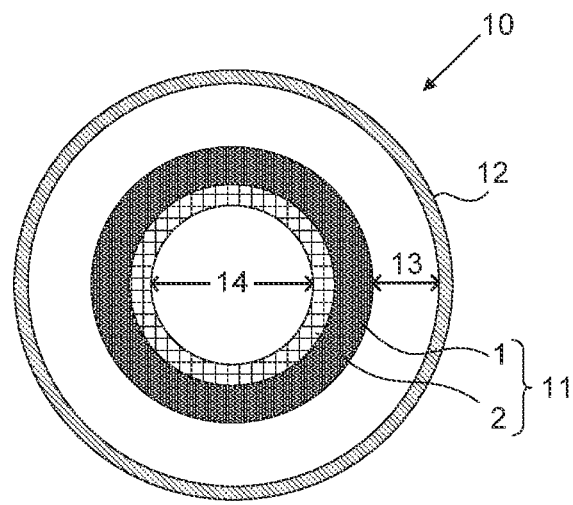
FIGS. 8A and 8B are configuration diagrams each schematically showing an outlined configuration in one embodiment of a $CO_2$ separation apparatus according to the present invention.
Figure 8B:
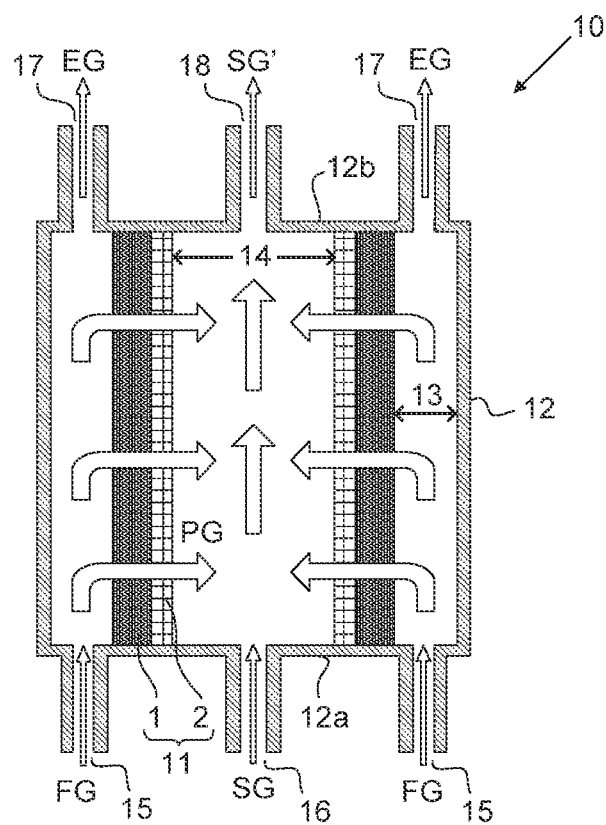

FIGS. 8A and 8B are each a sectional view schematically showing the outlined structure of a $CO_2$ separation apparatus 10 of this embodiment. In this embodiment, as an example, a facilitated $CO_2$ transport membrane modified to have a cylindrical structure is used to form a $CO_2$ separation membrane module, instead of the facilitated $CO_2$ transport membrane of a flat plate structure shown in the first embodiment. FIG. 8A shows a cross-sectional structure at a cross section perpendicular to the axial center of a facilitated $CO_2$ transport membrane (the present facilitated transport membrane) 11 of a cylindrical structure, and FIG. 8B shows a cross-sectional structure at a cross section extending through the axial center of the present facilitated transport membrane 11.

The present facilitated transport membrane 11 shown in FIGS. 8A and 8B has a structure in which a separation-functional membrane 1 is supported on the outer circumferential surface of a cylindrical hydrophilic ceramic porous membrane 2. Similarly to the first embodiment, the separation-functional membrane 1 includes the present copolymer as a membrane material; a $CO_2$ carrier composed of, for example, at least one of an alkali metal carbonate such as cesium carbonate ($Cs_2CO_3$) or rubidium carbonate ($Rb_2CO_3$), an alkali metal bicarbonate such as cesium bicarbonate ($CsHCO_3$) or rubidium bicarbonate ($RbHCO_3$), and an alkali metal hydroxide such as cesium hydroxide (CsOH) or rubidium hydroxide (RbOH); and a $CO_2$ hydration catalyst composed of, for example, at least one of a tellurous acid compound, a selenious acid compound, an arsenious acid compound, and an orthosilicic acid compound. The membrane structure in this embodiment is different from the membrane structure in the first embodiment in that the separation-functional membrane 1 and the hydrophilic ceramic porous membrane 2 are not held between two hydrophobic porous membranes. The method for producing the separation-functional membrane 1 and the membrane performance thereof in this embodiment are basically similar to those in the first embodiment except for the above difference, and therefore duplicate explanations will be omitted.

As shown in FIGS. 8A and 8B, the present cylindrical facilitated transport membrane 11 is housed in a bottomed cylindrical container 12, and a feed side space 13 surrounded by the inner wall of the container 12 and the separation-functional membrane 1 and a permeate side space 14 surrounded by the inner wall of the ceramic porous membrane 2 are formed. A first feeding port 15 for feeding a source gas FG into the feed side space 13 and a second feeding port 16 for feeding a sweep gas SG into the permeate side space 14 are provided on one of bottom portions 12a and 12b on opposite sides of the container 12, and a first discharge port 17 for discharging a $CO_2$-separated source gas EG from the feed side space 13 and a second discharge port 18 for discharging from the permeate side space 14 a discharge gas SG' including a mixture of a $CO_2$-containing permeate gas PG having permeated the present facilitated transport membrane 11 and the sweep gas SG are provided on the other of the bottom portions 12a and 12b on opposite sides of the container 12. The container 12 is made of, for example, stainless steel, and although not illustrated, the present facilitated transport membrane 11 is fixed in the container 12 with a fluororubber gasket interposed as a seal material between opposite ends of the present facilitated transport membrane 11 and the inner walls of the bottom portions 12a and 12b on opposite sides of the container 12 similarly to the experiment apparatus described in the first embodiment as an example. The method for fixing the present facilitated transport membrane 11 and the sealing method are not limited to the methods described above.

In FIG. 8B, each of the first feeding port 15 and the first discharge port 17 is provided in each of the feed side spaces 13 illustrated separately on the left and the right in FIG. 8B. However, since the feed side spaces 13 annularly communicate with each other as shown in FIG. 8A, the first feeding port 15 and the first discharge port 17 may be provided in one of the left and right feed side spaces 13. Further, FIG. 8B shows as an example a configuration in which the first feeding port 15 and the second feeding port 16 are provided on one of the bottom portions 12a and 12b, and the first discharge port 17 and the second discharge port 18 are provided on the other of the bottom portions 12a and 12b, but a configuration may be employed in which the first feeding port 15 and the second discharge port 18 are provided on one of the bottom portions 12a and 12b, and the first discharge port 17 and the second feeding port 16 are provided on the other of the bottom portions 12a and 12b. That is, the direction along which the source gases FG and EG flow and the direction along which the sweep gas SG and the discharge gas SG' flow may be reversed.

In the $CO_2$ separation method of this embodiment, the source gas FG including a $CO_2$-containing mixed gas is fed into the feed side space 13 and thereby supplied to the feed side surface of the present facilitated transport membrane 11, so that the $CO_2$ carrier in the separation-functional membrane 1 of the present facilitated transport membrane 11 is reacted with $CO_2$ in the source gas FG to allow selective passage of $CO_2$ at a high selective permeation rate, and the source gas EG with a reduced $CO_2$ concentration, resulting from the $CO_2$ separation, is discharged from the feed side space 13.

The reaction of $CO_2$ with the $CO_2$ carrier requires supply of water ($H_2O$) as shown in the above reaction formula of (Chemical Formula 2), and as the amount of water contained in the separation-functional membrane 1 increases, chemical equilibrium is shifted to the product side (right side), so that permeation of $CO_2$ is facilitated. When the temperature of the source gas FG is a high temperature of 100° C. or higher, the separation-functional membrane 1 that is in contact with the source gas FG is also exposed to a high temperature of 100° C. or higher, so that water contained in the separation-functional membrane 1 is evaporated and passes into the permeate side space 14 similarly to $CO_2$, and therefore it is necessary to supply steam ($H_2O$) to the feed side space 13. The steam may be contained in the source gas FG, or may be supplied to the feed side space 13 independently of the source gas FG. In the latter case, steam ($H_2O$) passing into the permeate side space 14 may be separated from the discharge gas SG' and circulated into the feed side space 13.

For the $CO_2$ separation apparatus shown in FIGS. 8A and 8B, a configuration example has been described in which the feed side space 13 is formed at the outside while the permeate side space 14 is formed at the inside of the present cylindrical facilitated transport membrane 11, but the feed side space 13 may be formed at the inside while the permeate side space 14 may be formed at the outside. The present facilitated transport membrane 11 may have a structure in which the separation-functional membrane 1 is supported on the inner circumferential surface of the cylindrical hydrophilic ceramic porous membrane 2. Further, the present facilitated transport membrane 11 used in the $CO_2$ separation apparatus is not necessarily cylindrical, but may be in the form of a tube having a cross-sectional shape other than a circular shape, and the present facilitated transport membrane of flat plate structure as shown in FIG. 1 may be used.

As an application example of the $CO_2$ separation apparatus, a shift converter ($CO_2$ permeable membrane reactor) including the present facilitated transport membrane will now be briefly described.

For example, when a $CO_2$ permeable membrane reactor is formed using the $CO_2$ separation apparatus 10 shown in FIGS. 8A and 8B, the feed side space 13 can be used as a shift converter by filling the feed side space 13 with a shift catalyst.

The $CO_2$ permeable membrane reactor is an apparatus in which, for example, a source gas FG produced in a steam reforming device and having $H_2$ as a main component is received in the feed side space 13 filled with a shift catalyst, and carbon monoxide (CO) contained in the source gas FG is removed through a CO shift reaction expressed by the following (Chemical Formula 7). $CO_2$ produced through the CO shift reaction is allowed to permeate to the permeate side space 14 selectively by means of the present facilitated transport membrane 11 and removed, whereby chemical equilibrium can be shifted to the hydrogen production side, so that CO and $CO_2$ can be removed beyond the limit imposed by equilibrium restriction with a high conversion rate at the same reaction temperature. A source gas EG freed of CO and $CO_2$ and having $H_2$ as a main component is taken out from the feed side space 13.

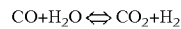

$$CO+H_2O \Leftrightarrow CO_2+H_2 \qquad \text{(Chemical Formula 7)}$$

Since the performance of the shift catalyst used for the CO shift reaction tends to decrease with a decrease in temperature, the use temperature is considered to be 100° C. at minimum, and the temperature of the source gas FG supplied to the feed side surface of the present facilitated transport membrane 11 is 100° C. or higher. Therefore, the source gas FG is adjusted to a temperature suitable for catalytic activity of the shift catalyst, then fed into the feed side space 13 filled with the shift catalyst, subjected to the CO shift reaction (exothermic reaction) in the feed side space 13, and supplied to the present facilitated transport membrane 11.

On the other hand, the sweep gas SG is used for maintaining the driving force for the permeation through the present facilitated transport membrane 11 by lowering the partial pressure of the $CO_2$-containing permeate gas PG which permeates the present facilitated transport membrane 11 and for discharging the permeate gas PG to the outside. It is to be noted that when the partial pressure of the source gas FG is sufficiently high, it is not necessary to feed the sweep gas SG because a partial pressure difference serving as the driving force for permeation is obtained even if the sweep gas SG is not fed. As a gas species used for the sweep gas, steam ($H_2O$) can also be used as in the case of the experiment for evaluation of membrane performance in the first embodiment, and further an inert gas such as Ar can also be used. The sweep gas SG is not limited to a specific gas species.

Other Embodiments

Hereinafter, other embodiments will be described.

<1> The above-mentioned embodiments have been described based on the assumption that a carbonate, a bicarbonate or a hydroxide of an alkali metal such as cesium or rubidium is used as a $CO_2$ carrier. However, since the present invention is characterized in that a gel membrane including the present copolymer that forms a separation-functional membrane contains a $CO_2$ carrier and a $CO_2$ hydration catalyst having catalytic activity at a high temperature of 100° C. or higher, the $CO_2$ carrier is not limited to a specific $CO_2$ carrier as long as it is such a $CO_2$ carrier that a reaction of $CO_2$ with the $CO_2$ carrier can be accelerated by a $CO_2$ hydration catalyst to attain membrane performance comparable to or higher than the membrane performance (selective permeability of $CO_2$ to hydrogen) shown as an example in the first embodiment.

<2> The above-mentioned embodiments have been described based on the assumption that the $CO_2$ hydration catalyst contains at least one of a tellurous acid compound, a selenious acid compound, an arsenious acid compound and an orthosilicic acid compound, but the $CO_2$ hydration catalyst is not limited to a specific $CO_2$ hydration catalyst as long as it is a $CO_2$ hydration catalyst which has catalytic activity for the $CO_2$ hydration reaction of the above (Chemical Formula 1) at a high temperature of 100° C. or higher, preferably 130° C. or higher, more preferably 160° C. or higher and which can attain membrane performance comparable to or higher than the membrane performance (selective permeability of $CO_2$ to hydrogen) shown as an example in the first embodiment when combined with a $CO_2$ carrier. When used in the separation-functional membrane of the present facilitated transport membrane, the $CO_2$ hydration catalyst is preferably one that has a melting point of 200° C. or higher and is soluble in water similarly to the above-mentioned compounds. While the upper limit of the range of temperatures at which the $CO_2$ hydration catalyst exhibits catalytic activity is not particularly limited, there is no problem as long as it is higher than the upper limit of the range of temperatures such as the use temperature of the present facilitated transport membrane in an apparatus including the present facilitated transport membrane, and the temperature of a source gas supplied to the feed side surface of the present facilitated transport membrane. The hydrophilic porous membrane or the like that forms the present facilitated transport membrane is also required to have resistance in a similar temperature range as a matter of course. When the present facilitated transport membrane is used at a temperature lower than 100° C., the $CO_2$ hydration catalyst is not necessarily required to have catalytic activity at a high temperature of 100° C. or higher. In this case, the lower limit of the temperature range where the $CO_2$ hydration catalyst exhibits catalytic activity is preferably lower than 100° C. depending on the operating temperature range of the present facilitated transport membrane.

<3> In the first embodiment, the present facilitated transport membrane is prepared by applying, to the hydrophilic PTFE porous membrane, the coating liquid containing the present copolymer, the $CO_2$ carrier, and the $CO_2$ hydration catalyst. Alternatively, the present facilitated transport membrane may be prepared by a method other than the above method. For example, the present facilitated transport membrane may be prepared by a process that includes forming a gel membrane including the present copolymer and being free of the $CO_2$ carrier and the $CO_2$ hydration catalyst and then impregnating the gel membrane with an aqueous solution containing the $CO_2$ carrier and the $CO_2$ hydration catalyst. In addition, the porous membrane to which the coating liquid is to be applied is also not limited to a hydrophilic porous membrane.

<4> In the first embodiment, the present facilitated transport membrane has a three-layer structure including a hydrophobic PTFE porous membrane, a separation-functional membrane supported by a hydrophilic PTFE porous membrane and a hydrophobic PTFE porous membrane, but the support structure of the present facilitated transport membrane is not limited to such a three-layer structure. For example, the present facilitated transport membrane may have a two-layer structure including a hydrophobic PTFE porous membrane and a separation-functional membrane supported by a hydrophilic PTFE porous membrane. The present facilitated transport membrane may also have a single-layer structure including a separation-functional membrane supported by a hydrophilic PTFE porous membrane. In the first embodiment, a case has been described where the separation-functional membrane is supported by the hydrophilic PTFE porous membrane, but the separation-functional membrane may be supported by the hydrophobic PTFE porous membrane.

<5> In the second embodiment, a $CO_2$ permeable membrane reactor has been shown as an application example of the $CO_2$ separation apparatus including the present facilitated transport membrane. The $CO_2$ separation apparatus including the present facilitated transport membrane can also be used in a decarbonation process performed in a large-scale plant for hydrogen production, urea production, or the like, other than membrane reactors. The $CO_2$ separation apparatus including the present facilitated transport membrane can also be used in applications other than hydrogen production process, such as separation of $CO_2$ from waste gases from thermal power plants, ironworks, or the like and separation of $CO_2$ during natural gas purification. The $CO_2$ separation apparatus is not limited to the application example shown in the above embodiment. The feed side gas (source gas) supplied to the present facilitated transport membrane is also not limited to the mixed gas shown as an example in the above embodiments.

<6> The mixing ratios of the components in the composition of the present facilitated transport membrane, the dimensions of the portions of the membrane and the like as shown as examples in the above-mentioned embodiments are examples given for easy understanding of the present invention, and the present invention is not limited to facilitated $CO_2$ transport membranes having such values.

INDUSTRIAL APPLICABILITY

The facilitated $CO_2$ transport membrane according to the present invention can be used for separating $CO_2$ with a high selective permeability from a $CO_2$-containing mixed gas in the decarbonation step of a large-scale process for hydrogen production, urea production, or the like, and can also be used in $CO_2$ permeable membrane reactors and the like.

DESCRIPTION OF SYMBOLS 1 separation-functional membrane
2 hydrophilic porous membrane
3, 4 hydrophobic porous membrane
10 $CO_2$ separation apparatus
11 facilitated $CO_2$ transport membrane
12 container
12a, 12b bottom portion (upper bottom portion and lower bottom portion) of container
13 feed side space
14 permeate side space
15 first feeding port
16 second feeding port
17 first discharge port
18 second discharge port
FG source gas
EG $CO_2$-separated source gas
PG permeate gas
SG, SG' sweep gas

The invention claimed is:

1. A facilitated $CO_2$ transport member comprising:
a separation-functional membrane, the membrane being a gel membrane of a hydrophilic polymer, the hydrophilic polymer comprising a $CO_2$ carrier and a $CO_2$ hydration catalyst, wherein the hydrophilic polymer is a copolymer comprising a first structural unit represented by Chemical Formula (1) shown below, where M represents cesium or rubidium, and a second structural unit represented by Chemical Formula (2) shown below, wherein the copolymer comprises a third structural unit selected from a group consisting of a structural unit derived from a methacrylic acid alkyl ester having an alkyl group of 1 to 16 carbon atoms, a structural unit derived from a maleic acid dialkyl ester having an alkyl group of 1 to 16 carbon atoms, a structural unit derived from a fumaric acid dialkyl ester having an alkyl group of 1 to 16 carbon atoms, and a structural unit derived from an itaconic acid dialkyl ester having an alkyl group of 1 to 16 carbon atoms, and wherein the $CO_2$ hydration catalyst has catalytic activity at a temperature of 100° C. or higher and a melting point of 200° C. or higher

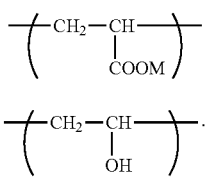

Chemical Formula (1)

Chemical Formula (2)

2. The facilitated $CO_2$ transport member according to claim 1, wherein the $CO_2$ hydration catalyst is soluble in water.

3. The facilitated $CO_2$ transport member according to claim 1, wherein the $CO_2$ hydration catalyst comprises at least one of a tellurous acid compound, a selenious acid compound, an arsenious acid compound, and an orthosilicic acid compound.

4. The facilitated $CO_2$ transport member according to claim 1, wherein a content of the second structural unit in the hydrophilic polymer is from 1 mol % to 90 mol % with respect to the total content of the first and second structural units.

5. The facilitated $CO_2$ transport member according to claim 1, wherein the $CO_2$ carrier comprises at least one of an alkali metal carbonate, an alkali metal bicarbonate, and an alkali metal hydroxide.

6. The facilitated $CO_2$ transport member according to claim 5, wherein an alkali metal included in one of the alkali metal carbonate, the alkali metal bicarbonate, and the alkali metal hydroxide is cesium or rubidium.

7. The facilitated $CO_2$ transport member according to claim 1, further comprising a hydrophilic porous membrane, wherein the separation-functional membrane is supported by the hydrophilic porous membrane.

8. A method for producing the facilitated $CO_2$ transport member according to claim 1, the method comprising the steps of:

coating a porous membrane with a coating liquid in which the hydrophilic polymer, the $CO_2$ carrier, the $CO_2$ hydration catalyst, and a medium containing water are included; and removing the medium from a resultant coating to produce the separation-functional membrane in the form of a gel.

9. A $CO_2$ separating method comprising the steps of:

supplying a $CO_2$-containing mixed gas to the facilitated $CO_2$ transport member according to claim 1; and separating from the mixed gas the $CO_2$ having permeated the facilitated $CO_2$ transport member.

10. A $CO_2$ separation membrane module comprising the facilitated $CO_2$ transport member according to claim 1.

11. A $CO_2$ separation apparatus comprising:

the facilitated $CO_2$ transport member according to claim 1;

a first feeding port, a second feeding port, a first discharge port, and a second discharge port, wherein:

the first feeding port is configured to feed a gas from a source of gas, including a $CO_2$-containing mixed gas, into a supply side of the facilitated $CO_2$ transport member;

the second feeding port is configured to feed a sweep gas into a permeate side of the facilitated $CO_2$ transport member;

the first discharge port is configured to discharge a $CO_2$-separated source gas from the supply side of the facilitated $CO_2$ transport member; and the second discharge port is configured to discharge a $CO_2$-containing permeate gas from the permeate side of the facilitated $CO_2$ transport member.

12. A resin composition comprising:

a $CO_2$ carrier;

a $CO_2$ hydration catalyst; and a copolymer comprising a first structural unit represented by Chemical Formula (1) shown below, where M represents cesium or rubidium, and a second structural unit represented by Chemical Formula (2) shown below, wherein the copolymer comprises a third structural unit selected from a group consisting of a structural unit derived from a methacrylic acid alkyl ester having an alkyl group of 1 to 16 carbon atoms, a structural unit derived from a maleic acid dialkyl ester having an alkyl group of 1 to 16 carbon atoms, a structural unit derived from a fumaric acid dialkyl ester having an alkyl group of 1 to 16 carbon atoms, and a structural unit derived from an itaconic acid dialkyl ester having an alkyl group of 1 to 16 carbon atoms, and wherein the $CO_2$ hydration catalyst has catalytic activity at a temperature of 100° C. or higher and a melting point of 200° C. or higher

Chemical Formula (1)

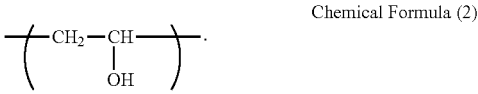

Chemical Formula (2)

13. The resin composition according to claim 12, wherein the $CO_2$ hydration catalyst is soluble in water.

14. The resin composition according to claim 12, wherein the $CO_2$ hydration catalyst comprises an oxo acid compound.

15. The resin composition according to claim 12, wherein the $CO_2$ hydration catalyst comprises at least one of a tellurous acid compound, a selenious acid compound, an arsenious acid compound, and an orthosilicic acid compound.

16. The resin composition according to claim 12, wherein a content of the second structural unit is from 1 mol % to 90 mol % with respect to the total content of the first and second structural units.

17. The resin composition according to claim 12, wherein the $CO_2$ carrier comprises at least one of an alkali metal carbonate, an alkali metal bicarbonate, and an alkali metal hydroxide.

18. The resin composition according to claim 17, wherein an alkali metal included in one of the alkali metal carbonate, the alkali metal bicarbonate, and the alkali metal is cesium or rubidium.

19. The resin composition according to claim 12, wherein a content of the $CO_2$ carrier is from 20% by weight to 90% by weight with respect to the total weight of the $CO_2$ carrier and the copolymer.

20. The resin composition according to claim 12, wherein the number of moles of the $CO_2$ hydration catalyst is at least 0.02 times the number of moles of the $CO_2$ carrier.

* * * * *